United States Patent
Wood et al.

(10) Patent No.: US 9,520,069 B2
(45) Date of Patent: Dec. 13, 2016

(54) METHOD AND SYSTEM FOR PROVIDING CONTENT FOR LEARNING APPLIANCES OVER AN ELECTRONIC COMMUNICATION MEDIUM

(75) Inventors: Michael C. Wood, Orinda, CA (US);
James Marggraff, Lafayette, CA (US);
Matthew Brown, Berkeley, CA (US);
Matt Fishbach, Piedmont, CA (US)

(73) Assignee: Leapfrog Enterprises, Inc., Pasadena, CA (US)

( * ) Notice: Subject to any disclaimer, the term of this patent is extended or adjusted under 35 U.S.C. 154(b) by 665 days.

(21) Appl. No.: 12/506,133

(22) Filed: Jul. 20, 2009
(Under 37 CFR 1.47)

(65) Prior Publication Data
US 2011/0029591 A1    Feb. 3, 2011

Related U.S. Application Data

(63) Continuation-in-part of application No. 10/374,736, filed on Feb. 24, 2003, and a continuation-in-part of
(Continued)

(51) Int. Cl.
*G09B 5/00* (2006.01)
*G09B 7/00* (2006.01)
(Continued)

(52) U.S. Cl.
CPC . *G09B 7/00* (2013.01); *G09B 5/00* (2013.01); *G09B 5/04* (2013.01); *G09B 5/06* (2013.01);
(Continued)

(58) Field of Classification Search
CPC ............... G09B 5/00; G09B 5/04; G09B 5/06; G09B 5/062; G09B 5/065; G09B 5/14; G09B 7/00; G09B 7/02; G09B 7/04; G09B 7/06; G09B 7/08; G09B 17/003; G09B 17/006; G09B 19/00; G09B 19/025; G09B 19/04
(Continued)

(56) References Cited

U.S. PATENT DOCUMENTS

| | | | |
|---|---|---|---|
| 882,604 A | 3/1908 | Wood | |
| 2,826,828 A | 3/1958 | Hamilton | |

(Continued)

FOREIGN PATENT DOCUMENTS

| | | |
|---|---|---|
| JP | S59-44078 A | 3/1984 |
| JP | S61-252575 A | 11/1986 |

(Continued)

OTHER PUBLICATIONS

Non-Final Office Action dated Jul. 17, 2015 for U.S. Appl. No. 10/374,736, 17 pages.
(Continued)

*Primary Examiner* — Nikolai A Gishnock
(74) *Attorney, Agent, or Firm* — Kilpatrick Townsend & Stockton LLP

(57) ABSTRACT

A method, a user interface, and an educational content server for assisting a user in learning using interactive learning appliances are disclosed. The performance information of the user, which may be in the form of a user log file in an interactive learning appliance, may be received at a server computer from a site where the user is present. The performance information and profile information can then be presented in the user interface and used to generate an electronic content package. The electronic content package can then be received and loaded into the interactive learning appliance.

21 Claims, 17 Drawing Sheets

Related U.S. Application Data application No. 09/632,424, filed on Aug. 4, 2000, now Pat. No. 6,801,751.

(60) Provisional application No. 60/360,278, filed on Feb. 26, 2002, provisional application No. 60/181,967, filed on Feb. 10, 2000, provisional application No. 60/168,214, filed on Nov. 30, 1999.

(51) Int. Cl.
| | |
|---|---|
| G09B 19/00 | (2006.01) |
| G09B 5/04 | (2006.01) |
| G09B 5/06 | (2006.01) |
| G09B 5/14 | (2006.01) |
| G09B 7/02 | (2006.01) |
| G09B 7/04 | (2006.01) |
| G09B 7/06 | (2006.01) |
| G09B 7/08 | (2006.01) |
| G09B 17/00 | (2006.01) |
| G09B 19/02 | (2006.01) |
| G09B 19/04 | (2006.01) |

(52) U.S. Cl.
CPC ............. *G09B 5/062* (2013.01); *G09B 5/065* (2013.01); *G09B 5/14* (2013.01); *G09B 7/02* (2013.01); *G09B 7/04* (2013.01); *G09B 7/06* (2013.01); *G09B 7/08* (2013.01); *G09B 17/003* (2013.01); *G09B 17/006* (2013.01); *G09B 19/00* (2013.01); *G09B 19/025* (2013.01); *G09B 19/04* (2013.01)

(58) Field of Classification Search
USPC 434/307, 308, 322, 323, 350, 362; 446/175, 301; 463/35, 39, 42, 43
See application file for complete search history.

(56) References Cited

U.S. PATENT DOCUMENTS

| | | | |
|---|---|---|---|
| 2,921,385 A | 1/1960 | Hamilton | |
| 3,052,041 A | 9/1962 | Luxton et al. | |
| 3,100,365 A | 8/1963 | Stalder | |
| 3,371,321 A | 2/1968 | Adams | |
| 3,593,433 A | 7/1971 | Dillon | |
| 3,660,913 A | 5/1972 | Heath | |
| 3,949,488 A | 4/1976 | Welch | |
| 3,977,292 A | 8/1976 | Favilli et al. | |
| 4,040,206 A | 8/1977 | Kimura | |
| 4,217,726 A | 8/1980 | Flicker et al. | |
| 4,356,658 A | 11/1982 | Goldfarb | |
| 4,431,312 A | 2/1984 | Chambers et al. | |
| 4,671,514 A | 6/1987 | Wilson-Diehl | |
| 4,679,789 A | 7/1987 | Okada | |
| 4,690,645 A | 9/1987 | Ukisu | |
| 4,840,602 A | 6/1989 | Rose | |
| 4,846,693 A | 7/1989 | Baer | |
| 4,889,027 A | 12/1989 | Yokoi | |
| 4,923,428 A | 5/1990 | Curran | |
| 4,983,890 A | 1/1991 | Satoh et al. | |
| 4,997,374 A | 3/1991 | Simone | |
| 5,002,491 A | 3/1991 | Abrahamson et al. | |
| 5,013,276 A | 5/1991 | Garfinkel | |
| 5,018,082 A | 5/1991 | Obata et al. | |
| 5,040,319 A | 8/1991 | Wang et al. | |
| 5,095,798 A | 3/1992 | Okada et al. | |
| 5,114,376 A | 5/1992 | Copley et al. | |
| 5,122,952 A | 6/1992 | Minkus | |
| 5,184,830 A | 2/1993 | Okada et al. | |
| 5,188,533 A | 2/1993 | Wood | |
| 5,191,615 A | 3/1993 | Aldava et al. | |
| 5,204,968 A | 4/1993 | Parthasarathi | |
| 5,245,656 A | 9/1993 | Loeb et al. | |
| 5,261,823 A | 11/1993 | Kurokawa | |
| 5,267,865 A * | 12/1993 | Lee et al. | 434/350 |
| 5,270,480 A | 12/1993 | Hikawa | |
| 5,302,132 A | 4/1994 | Corder | |
| 5,307,263 A | 4/1994 | Brown | |
| RE34,728 E | 9/1994 | Hall-Tipping | |
| 5,345,153 A | 9/1994 | Vaught | |
| 5,377,100 A | 12/1994 | Pope et al. | |
| 5,387,104 A | 2/1995 | Corder | |
| 5,412,890 A | 5/1995 | Fechter | |
| 5,413,355 A | 5/1995 | Gonzalez | |
| 5,478,240 A | 12/1995 | Cogliano | |
| 5,485,068 A | 1/1996 | Vaught | |
| 5,493,185 A | 2/1996 | Mohr et al. | |
| 5,511,980 A * | 4/1996 | Wood | 434/169 |
| 5,513,308 A | 4/1996 | Mori | |
| D370,221 S | 5/1996 | Firlow | |
| 5,535,321 A | 7/1996 | Massaro et al. | |
| 5,562,453 A | 10/1996 | Wen | |
| 5,587,545 A | 12/1996 | Nakada et al. | |
| 5,597,312 A | 1/1997 | Bloom et al. | |
| 5,614,940 A | 3/1997 | Cobbley et al. | |
| 5,636,994 A | 6/1997 | Tong | |
| 5,655,945 A | 8/1997 | Jani | |
| D384,703 S | 10/1997 | Chuang | |
| 5,681,170 A | 10/1997 | Rieber et al. | |
| 5,683,082 A | 11/1997 | Takemoto et al. | |
| 5,685,776 A | 11/1997 | Stambolic et al. | |
| 5,697,829 A * | 12/1997 | Chainani et al. | 446/436 |
| 5,717,923 A | 2/1998 | Dedrick | |
| 5,724,074 A * | 3/1998 | Chainani et al. | 345/474 |
| 5,727,950 A | 3/1998 | Cook et al. | |
| 5,727,951 A | 3/1998 | Ho et al. | |
| 5,733,131 A | 3/1998 | Park | |
| 5,740,549 A | 4/1998 | Reilly et al. | |
| 5,746,602 A * | 5/1998 | Kikinis | 434/169 |
| 5,752,880 A | 5/1998 | Gabai et al. | |
| 5,754,939 A | 5/1998 | Herz et al. | |
| 5,761,662 A | 6/1998 | Dasan | |
| 5,766,077 A | 6/1998 | Hongo | |
| 5,774,118 A | 6/1998 | Hatakama | |
| 5,779,486 A | 7/1998 | Ho et al. | |
| 5,788,508 A | 8/1998 | Lee et al. | |
| 5,800,243 A | 9/1998 | Berman | |
| 5,813,861 A | 9/1998 | Wood | |
| 5,819,284 A | 10/1998 | Farber et al. | |
| 5,820,386 A | 10/1998 | Sheppard, II | |
| 5,823,781 A | 10/1998 | Hitchcock et al. | |
| 5,829,983 A * | 11/1998 | Koyama et al. | 434/350 |
| RE36,028 E | 1/1999 | Deesen et al. | |
| 5,855,483 A * | 1/1999 | Collins et al. | 434/322 |
| 5,863,208 A | 1/1999 | Ho et al. | |
| 5,873,765 A * | 2/1999 | Rifkin et al. | 446/301 |
| 5,879,163 A | 3/1999 | Brown et al. | |
| D407,939 S | 4/1999 | Bear | |
| D410,165 S | 5/1999 | Bear | |
| 5,902,116 A | 5/1999 | Rieber et al. | |
| 5,904,485 A * | 5/1999 | Siefert | 434/350 |
| 5,910,009 A | 6/1999 | Leff et al. | |
| 5,915,238 A | 6/1999 | Tjaden | |
| 5,926,442 A | 7/1999 | Sirhan et al. | |
| D413,149 S | 8/1999 | Chan et al. | |
| 5,944,533 A | 8/1999 | Wood | |
| 5,945,985 A * | 8/1999 | Babin et al. | 715/209 |
| 5,947,474 A | 9/1999 | Kanagawa et al. | |
| 5,952,932 A | 9/1999 | Sorensen | |
| 5,957,699 A | 9/1999 | Peterson et al. | |
| 5,962,839 A | 10/1999 | Eskildsen | |
| 5,967,793 A | 10/1999 | Ho et al. | |
| 5,971,850 A | 10/1999 | Liverance | |
| 5,971,855 A | 10/1999 | Ng | |
| 5,995,455 A | 11/1999 | Kutosky | |
| 6,010,339 A | 1/2000 | McDonald | |
| 6,012,961 A | 1/2000 | Sharpe, III et al. | |
| 6,021,306 A | 2/2000 | McTaggart | |
| 6,029,042 A | 2/2000 | Yaron-Moallim | |
| 6,036,496 A | 3/2000 | Miller et al. | |
| 6,039,575 A * | 3/2000 | L'Allier et al. | 434/362 |
| 6,039,625 A | 3/2000 | Wang | |
| 6,042,478 A | 3/2000 | Ng | |

(56) References Cited

U.S. PATENT DOCUMENTS

| | | | |
|---|---|---|---|
| 6,045,430 A | 4/2000 | How | |
| 6,064,854 A | 5/2000 | Peters et al. | |
| 6,064,856 A | 5/2000 | Lee et al. | |
| 6,074,212 A | 6/2000 | Cogliano | |
| 6,075,195 A | 6/2000 | Gabai et al. | |
| 6,083,104 A | 7/2000 | Choi | |
| 6,089,942 A | 7/2000 | Chan | |
| 6,112,442 A | 9/2000 | Liang | |
| 6,130,892 A | 10/2000 | Short et al. | |
| 6,135,776 A * | 10/2000 | Erturk et al. | 434/276 |
| 6,142,784 A * | 11/2000 | Wood | 434/201 |
| 6,144,673 A | 11/2000 | Korus | |
| 6,149,441 A | 11/2000 | Pellegrino et al. | |
| D434,799 S | 12/2000 | Wood | |
| 6,159,101 A | 12/2000 | Simpson | |
| 6,160,986 A * | 12/2000 | Gabai et al. | 434/308 |
| 6,164,975 A | 12/2000 | Weingarden et al. | |
| 6,179,682 B1 | 1/2001 | Plain et al. | |
| 6,190,178 B1 | 2/2001 | Oh | |
| 6,192,215 B1 | 2/2001 | Wang | |
| 6,192,340 B1 | 2/2001 | Abecassis | |
| 6,202,060 B1 | 3/2001 | Tran | |
| 6,206,750 B1 * | 3/2001 | Barad et al. | 446/268 |
| 6,211,451 B1 | 4/2001 | Tohgi et al. | |
| 6,270,351 B1 * | 8/2001 | Roper | 434/350 |
| 6,270,352 B1 | 8/2001 | Ditto | |
| 6,290,504 B1 | 9/2001 | Benitz et al. | |
| 6,290,566 B1 | 9/2001 | Gabai et al. | |
| 6,299,452 B1 | 10/2001 | Wasowicz et al. | |
| 6,301,462 B1 | 10/2001 | Freeman et al. | |
| 6,317,714 B1 | 11/2001 | Del Castillo et al. | |
| 6,319,010 B1 * | 11/2001 | Kikinis | 434/169 |
| 6,328,569 B1 | 12/2001 | Jenkins et al. | |
| 6,330,426 B2 | 12/2001 | Brown et al. | |
| 6,368,177 B1 * | 4/2002 | Gabai et al. | 446/404 |
| 6,394,872 B1 | 5/2002 | Watanabe et al. | |
| 6,427,063 B1 | 7/2002 | Cook et al. | |
| 6,443,796 B1 | 9/2002 | Shackelford | |
| 6,463,257 B1 | 10/2002 | Wood | |
| 6,572,431 B1 | 6/2003 | Maa | |
| 6,773,344 B1 * | 8/2004 | Gabai et al. | 463/1 |
| 6,801,751 B1 * | 10/2004 | Wood et al. | 434/362 |
| 6,816,703 B1 | 11/2004 | Wood et al. | |
| 6,845,398 B1 | 1/2005 | Galensky et al. | |
| 6,882,824 B2 * | 4/2005 | Wood | 434/308 |
| 7,213,005 B2 * | 5/2007 | Mourad et | 705/64 |
| 7,818,400 B2 | 10/2010 | Wood et al. | |
| 2001/0053980 A1 * | 12/2001 | Suliman et al. | 705/1 |
| 2002/0022523 A1 * | 2/2002 | Dan et al. | 463/42 |
| 2002/0032708 A1 * | 3/2002 | Gupta et al. | 707/539 |
| 2002/0082952 A1 * | 6/2002 | Johnston | 705/27 |
| 2003/0059757 A1 * | 3/2003 | Wood | 434/308 |
| 2003/0064812 A1 * | 4/2003 | Rappaport et al. | 463/43 |
| 2003/0129576 A1 * | 7/2003 | Wood et al. | 434/362 |

FOREIGN PATENT DOCUMENTS

| | | | | |
|---|---|---|---|---|
| JP | 2003-527628 A | 9/2003 | | |
| WO | WO 99/65007 A1 | 12/1999 | | |
| WO | WO 01/41114 A1 | 6/2001 | | |
| WO | WO 0141101 A1 * | 6/2001 | | G09B 19/00 |

OTHER PUBLICATIONS

Mary Kathleen Flynn with Melissa J. Perenson, "The Daily Me", PC Magazine, Sep. 14, 1993, p. 29.

John R. Quain, "Journalist Delivers Your Own Personalized Newspaper", PC Magazine, Oct. 12, 1993, p. 49.

"Classic Toys 2001: VTech Industries, Little Smart Tiny Touch Phone", <http://www.drtoy.org/drtoy/vtech.sub.-tinytouch.sub.-2001c.htm>, 1990.

LeapFrog "Create-a-Word SuperMat" and "Create-a-Word Traveler" Manual, 2 pages, 1997.

VTech "Little Smart Number Desk" Manual, 6 pages (estimated publication date before 1995).

VTech Fun to Talk Phone Manual, 5 pages, 1993.

VTech Little Smart Dial a Smile Manual, 6 pages, 1993.

VTech Smart Play, "Little Smart Alphabet Desk", 3 pages, 1992.

VTech Smart Play, "Little Smart Number Desk", 4 pages, 1995.

VTech Smart Play, "Video Painter", 3 pages, 1993.

Bannan et al. "Mattel My Interactive Pooh", PC Magazine, Dec. 14, 1998 (1 page) http://home.zdnet.com/filters/printerfriendly/0,6061,374729-3,00.html (downloaded Oct. 30, 1999).

Inventor News, "Lego Mindstorms Kicks Off Robo Tour '98, a 30-City Tour of All Things Robotic", Jul. 30, 1998 (3 pages). http://www.inventornet.com/news/1998/07/19980730-02,htm (downloaded Oct. 30, 1999).

Ricadela, "Interactive Dolls The Talk of toy Fair", Computer Retail Week, Feb. 9, 1998 (3 pages).

Lego® Mindstorms™ Robotics Invention System™, http://www.legomindstorms.com/press/whatis,asp (Oct. 30, 1999) (3 pages).

Frangos, Alex; "E-Commerce (A Special Report): Essay—Here's my Advice . . . If Amazon has a suggestion for you, be prepared for some good ideas—and a lot of confusion"; *Wall Street Journal (Eastern Edition)*; Jan. 14, 2002, p. R. 15; New York, NY.

Edwards, Marcelene; "Customizing online shopping Amazon: E-tailer shows each customer a different Web page, reflectin gpast buys, preferences in books, music; [South Sound Edition]"; *The News Tribune*; Jun. 27, 2001; p. D. 1; Tacoma, Washington.

* cited by examiner

| ID | Task Name | 1 | 2 | 3 | 4 |
|---|---|---|---|---|---|
| 2 | Numerals | Numerals | | | |
| 3 | Identify 1 to 12 | | | | |
| 4 | Identify 1 to 100 | | | | |
| 5 | Place Value | | Place Value | | |
| 6 | Identify 10's and1's place | | | | |
| 7 | Indicate less/greater, numerals less than 50 | | | | |
| 8 | Symbols | | Symbols | | |
| 9 | Recognize + - = | | | | |
| 10 | Number Sense | | | Number Sense | |
| 11 | Identify missing number | | | | |

FIG. 5A

| ID | Task Name | 1 | 2 | 3 | 4 |
|---|---|---|---|---|---|
| 12 | Addition | | | Addition | |
| 13 | Sums to 12 | | | | |
| 14 | Subtraction | | | | Subtract |
| 15 | Facts to 12 | | | | |
| 16 | Problem Solving | | | | Problem |
| 17 | Solve one step oral | | | | |
| 18 | Solve one-step using pennies, nickels, dimes | | | | |
| 19 | Money | Money | | | |
| 20 | Identify value of penny, nickel, dime | | | | |
| 21 | Exchange penny, nickel, dime for equivalents | | | | |
| 22 | Time | Time | | | |
| 23 | Name number of hours in a day, days in a week, months in a year | | | | |
| 24 | Read time to the hour | | | | |

FIG. 5B

| Level One - Mastery | | | | | | Key:<br>T & S Base Content | Key:<br>T & S Downloaded Content |
|---|---|---|---|---|---|---|---|
| | Skill Area | | | | | | |
| | | Tools | | | | | |
| | | | Skill | | Example | Common Error | Error Example |
| | | Numbers | | | | | |
| | | | Numerals | | | | |
| | | | | Identify numerals 1 to 12 | Dial 7? | Faulty numeral recognition | Dial 7 - answer 4 |
| | | | | Identify numerals to 100 in random order | "Dial 37?" | Faulty numeral recognition | "Dial 44" - answer 55 |
| | | | Number Sense | | | | |
| | | | | Identify missing number in a sequence | 4, _, 6, 7 | Counting error | Answer > 4, 9, 6, 7 |
| | | | Place Value | | | | |
| | | | | Identify number in 10's and 1's place | How many 10's | Faulty place recognition | How many 10's >58 Answer: 8 |
| | | | | Indicate less than or greater than (without using signs) when given two numerals less than 50 | Which is bigger - 15, 18? | Number line error | Bigger - 18. Doesn't visualize position on number line. |
| | | Symbols | | | | | |
| | | | | Recognize the following symbol: +, -, x, ÷, = | Dial the sign for adding... | Faulty symbol recognition | "Dial the sign for adding"? Answer ="-" |
| | Computation | | | | | | |
| | | Addition | | | | | |
| | | | | Compute with addition facts, sums to 12 | 6 + 3 = ? | Fact error | 4 + 2 = 7 |
| | | Subtraction | | | | | |
| | | | | Compute with subtraction facts to 12 | 7 - 2 = ? | Fact error | 7 - 2 = 9 |

FIG. 6A

| Level Two - Mastery | | | | | Key: T & S Base Content | Key: T & S Downloaded Content |
|---|---|---|---|---|---|---|
| | Skill Area | | | | | |
| | | Tools | | | | |
| | | | Skill | Example | Common Error | Error Example |
| | Numbers | | | | | |
| | | Number Sense | | | | |
| | | | Identify numerals to 999 | "Dial 372?" | Faulty numeral recognition | "Dial 372" - answer 472 |
| | | | Identify the missing element in a numerical sequence of two or three digit numbers | Fill in the blank > 99, 100, __, 102 | Counting error | Any incorrect response |
| | | | Skip count by 5's to 100, 2's to 50, 10's to 100 | Display - 20 Audio: "Count by 10's. What comes next?" Dial 30 and slam | Counting error | Any incorrect response |
| | | Place Value | | | | |
| | | | Identify place value of digit through 100's | What number in 10's place > 891? | Faulty place recognition | How many 100's > 891 Answer: 9 |
| | | Symbols | | | | |
| | | | Recognize the multiplication symbol (x) | Dial the sign for multiplying | Faulty symbol recognition | Any incorrect response |
| | Computation | | | | | |
| | | Addition | | | | |
| | | | Compute with addition facts sums to 18 | 9 + 9 = ? | Fact error | 4 + 2 = 7 |
| | | | Compute sum with 2-digit numbers (no regrouping) | 25 + 31 = ? | Error in column position | 23 + 31 = 34 |
| | | | Compute sum of 2-digit numbers with regrouping | 49 + 15 = ? | Forget to add carrier number | 27 + 39 = 56 |

FIG. 6B

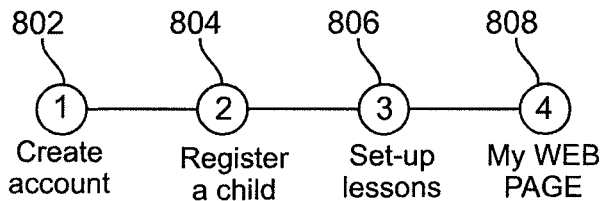

Step 2 - Register a child

Do you want your child to sign in without parental supervision? If so, click here to create a user name for your child.

Child's First Name: [matthew]     } 924

Child's LeapFrog Toys
To create a My LeapFrog page, you must first select which Internet-enabled toys you own.

☐ Imagination Desk™          ☐ School-Time LeapTop™
☑ iQuest™ Handheld           ☑ Turbo Twist™ Fact Blaster
☐ Leap's Learning Band™      ☐ Turbo Twist™ Math
☐ LeapPad® Learning System   ☑ Turbo Twist™ Spelling
☐ LeapPad® Advantage         ☐ Turbo Twist™ Vocabulator
☐ LeapPad® Pro

} 922

Child's School Grade: [Select one ▼]

The following information is optional:

Child's Birthday:  Month  Day  Year
[Month ▼] [Day ▼] [     ]

} 926

To add another child to your membership, click ADD ANOTHER CHILD. If not, click NEXT STEP.

(>) ADD ANOTHER CHILD — 928
(>) NEXT STEP — 930

FIG. 9

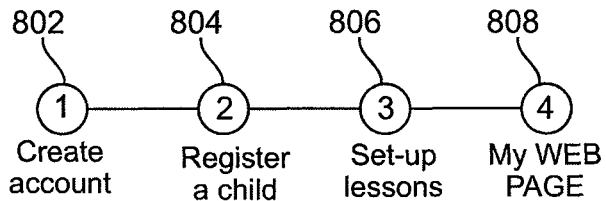

802 — 1 Create account
804 — 2 Register a child
806 — 3 Set-up lessons
808 — 4 My WEB PAGE

Step 3 - Set-up lessons matthew

1032 LeapFrog® Never-Ending Learning Club - iQuest™ Handheld
Prepare for tests with fun, interactive audio quiz games, and chapter outlines from your school textbook.

- ⦿ 52-week Program
  A curriculum-based program delivering weekly activity packs and email reminders.
  ☑ Yes, send me email reminders

LeapFrog® Never-Ending Learning Club - Turbo Twist™ Spelling
Learn to spell like a pro with your personal brain trainer.

- ⦿ 52-week Program
  A curriculum-based program delivering weekly activity packs and email reminders.
  ☑ Yes, send me email reminders
- ○ Self-Paced Program    1038
  A program that prescribes new activities based on your child's progress.

LeapFrog® Never-Ending Learning Club - Turbo Twist™ Fact Blaster
Learn loads of important facts in seven educational categories.

- ⦿ 52-week Program
  A curriculum-based program delivering weekly activity packs and email reminders.
  ☑ Yes, send me email reminders

- ○ Self-Paced Program
  A program that prescribes new activities based on your child's progress.

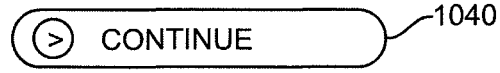

Imagination Desk Activity Sheets

Select a week below to get the audio that makes the activity sheets come to life. You can then print the corresponding coloring pages in the following steps.

Have you installed LeapPrint?   1202

( > ) VIEW PAST ACTIVITY PACKS

1 - 10 of 15   More ▷

ACTIVITY SHEET NAME ( > ) GET   Get Ready for Kindergarten - Week 15
Learn letters and phonics - V, W and X/Y/Z ( > ) GET   Get Ready for Kindergarten - Week 14
Learn letters and phonics - S, T and U ( > ) GET   Get Ready for Kindergarten - Week 13
Learn letters and phonics - P, Q and R ( > ) GET   Get Ready for Kindergarten - Week 12
Learn letters and phonics - M, N and O ( > ) GET   Get Ready for Kindergarten - Week 11
Learn letters and phonics - J, K and L ( > ) GET   Get Ready for Kindergarten - Week 10   1200
Learn letters and phonics - G, H and I ( > ) GET   Get Ready for Kindergarten - Week 9
Learn letters and phonics - D, E and F ( > ) GET   Get Ready for Kindergarten - Week 8
Learn letters and phonics - A, B and C ( > ) GET   Get Ready for Kindergarten - Week 7
Learn numbers and counting - 19, 20 and review ( > ) GET   Get Ready for Kindergarten - Week 6

FIG. 12

Download Your Activity Sheets

Get Ready for Kindergarten - Week 15
Grade level: pre-K
Product: Imagination Desk

Imagination Desk

Step 1 - Download Audio > Step 2 - Print Activity Sheets

Examples of what this activity pack includes:

Learn letters and phonics - V, W and X/Y/Z
- Sheet 1: Leap watches Mom play VIOLIN
- Sheet 2: Tad and Dad wash the WINDOW
- Sheet 3: Lily sees her YO-YO in an X-Ray at the ZOO

Get Ready for Kindergarten - Week 15 /1306

( > ) DOWNLOAD AUDIO

GETTING YOUR ACTIVITY SHEET
1. Make sure you have exited all programs that use your serial-port (Palm™ software or digital camera).
2. Make sure the Mind Station is connected to the computer, the cartridge is in the slot and the light is on.

FIG. 13

METHOD AND SYSTEM FOR PROVIDING CONTENT FOR LEARNING APPLIANCES OVER AN ELECTRONIC COMMUNICATION MEDIUM

CROSS-REFERENCES TO RELATED APPLICATIONS

This application is a continuation-in-part of U.S. Non-Provisional application Ser. No. 10/374,736 filed on Feb. 24, 2003 which is a non-provisional of and claims the benefit of U.S. Provisional Patent Application No. 60/360,278, filed on Feb. 26, 2002, and which is a continuation-in-part of U.S. patent application Ser. No. 09/632,424, filed on Aug. 4, 2000, now U.S. Pat. No. 6,801,751, which claims the benefit of U.S. Provisional Patent Application Nos. 60/181,967, filed on Feb. 10, 2000 and 60/168,214 filed on Nov. 30, 1999. All of the above U.S. patent applications (provisional and non-provisional) are herein incorporated by reference in their entirety for all purposes.

BACKGROUND

A number of electronic learning appliances exist to help a user learn about a particular subject. In one conventional electronic learning appliance, the device randomly requests a response from the user, such as how to spell a particular word. The user then inputs a response into an input device, such as a keyboard. The device then tells the user if the response is correct.

A problem with this type of device is that the device typically includes subject matter having only a single level of intellectual difficulty. While a device having a single level of intellectual difficulty may be effective in maintaining the attention span of a child possessing a corresponding level of intelligence, it has been found that this type of device is not as effective in maintaining the attention span of children having higher or lower levels of intelligence. For example, a child with a lower level of intelligence than the intellectual level provided by a learning appliance of this type would become easily frustrated by the difficulty of the questions provided by the device. Likewise, a child having a higher level of intelligence than the intellectual level provided by the device would become bored with the device because the questions are too easy.

Some have attempted to solve this problem by providing an electronic learning appliance that, after receiving responses from the user, automatically adjusts the level of difficulty to the user's level of intelligence. The device operates to lower the level of difficulty of the requests when the user responds inappropriately, and further operates to increase the level of difficulty when the user responds appropriately. The device maintains a level of difficulty, and then raises or lowers the level of difficulty to maintain the attention of the user.

While an electronic learning appliance such as this one is effective in some instances, a number of improvements could be made. For example, the educational content included in the learning appliances mentioned above is limited. Even if an electronic learning appliance is capable of adjusting its level of difficulty to the user's level of intelligence, the user will have interacted with all of the educational content in the electronic learning appliance at some point. For example, an educational toy may include specific educational content that is pre stored on a ROM (read only memory) chip within the toy. The chip contains only a limited amount of audio and/or visual data and the visual and audio outputs that the toy can produce are therefore limited. The user may learn the correct answers to a specific set of questions without having mastered the general principles representative of a level of learning. After the user has interacted with all of the available content, the user will become bored and will no longer be interested in using the device. This may also frustrate parents who may buy the toy only to see their children not use the toy. The user will then have to purchase another learning appliance with different electronic content. Even if another learning appliance is available, this option is costly to the user.

In an effort to alleviate the cost of buying a new device, some conventional solutions provide new content for an educational toy by reprogramming a memory chip used in a toy with new audio and visual data from an external source. For example, one conventional Web site allowed users to download new audio data for toys to change the content of the toys. Separate links were provided for each of the separate toys. When a link for a particular toy was selected, the audio data could be downloaded and then used in a person's toy.

Moreover, the user can easily become disinterested in the learning appliance if the electronic content is not specifically suited for the user's needs or preferences. For example, if a learning appliance is intended to teach math to a user by providing problems relating to cooking (e.g., if 6 teaspoons of sugar are added to a cake mixture, how many tablespoons of sugar are added to the cake mixture?), those users who are not interested cooking-related math problems may not be interested in using the device.

In another example, a user may have mastered multiplication, addition, and subtraction, but may have had trouble mastering division. The educational benefit derived by the user may be limited if the device provides an equal number of problems in each of these subject areas. In other words, if the device provides too many problems in those subjects where the user is proficient and not enough problems in those subjects where the user is deficient, the educational benefit obtained by the user may not be adequate to help the user quickly overcome his learning deficiencies (e.g., in division).

Furthermore, when the users are children, adults such as parents and teachers cannot monitor the child's progress when the child uses conventional learning appliances. Information regarding the child's interaction with the device is not stored. Consequently, adults may be unaware of the child's learning difficulties and the child may not receive the needed guidance from adults to assist the child in learning. Accordingly, an improved learning appliance would be desirable.

Embodiments of the invention address these and other problems, individually and collectively.

SUMMARY

Embodiments of the invention include methods and systems for providing electronic content to an interactive learning appliance.

One embodiment of the present invention is directed to a method of downloading educational content comprising: retrieving profile information of a user at a server computer; retrieving one or more user performance logs comprising performance information for the user from one or more user log files for the user; receiving a user log file for the user from a first interactive learning appliance wherein the user log file is recorded while the user interacts with one or more content packages using the first interactive learning appliance; analyzing the user log file and the one or more performance logs; generating a report showing the user's performance based on the user log file and the one or more user performance logs; generating content to be included in a content package tailored to the profile information of the user, wherein the content package is used in an interactive learning appliance; and sending the content package to a client computer via an electronic communication medium.

Another embodiment of the invention is directed to a user interface on a host site configured to be displayed on a client computer, the user interface comprising: profile information of the user; a log file received from an interactive learning appliance; a report showing the user's performance based on a user log file and one or more user performance logs; and content to be included in a content package tailored to the profile information of the user and the report showing the user's performance.

Another embodiment of the invention is directed to a system comprising: an educational content server comprising (i) a personal adaptive learning module configured to receive performance information for a plurality of users captured while the plurality of users interact with one or more interactive learning appliances, (ii) an automatic content packager, (iii) an update module; and (iv) a website, wherein the personal adaptive learning module can analyze the performance information to create a content package for the one or more of the plurality of users.

These and other embodiments of the invention are described in detail below.

BRIEF DESCRIPTION OF THE DRAWINGS

FIGS. 5A to 5B show matrices illustrating the relationship between specific types of problems and zones for a math-based interactive learning appliance.

FIGS. 6A to 6B show tables illustrating particular types of common errors associated with certain skills.

FIG. 9 shows a user interface where a person can select a set of toys from a group of toys.

FIG. 10 shows a user interface where a user can set up a learning program and receive e-mail reminders.

FIG. 12 shows a user interface in which a toy that was previously selected along with a plurality of buttons for downloading content packages for the toy.

FIG. 13 shows a user interface with a selectable button for downloading audio data for a particular lesson.

DETAILED DESCRIPTION

Figure 1:
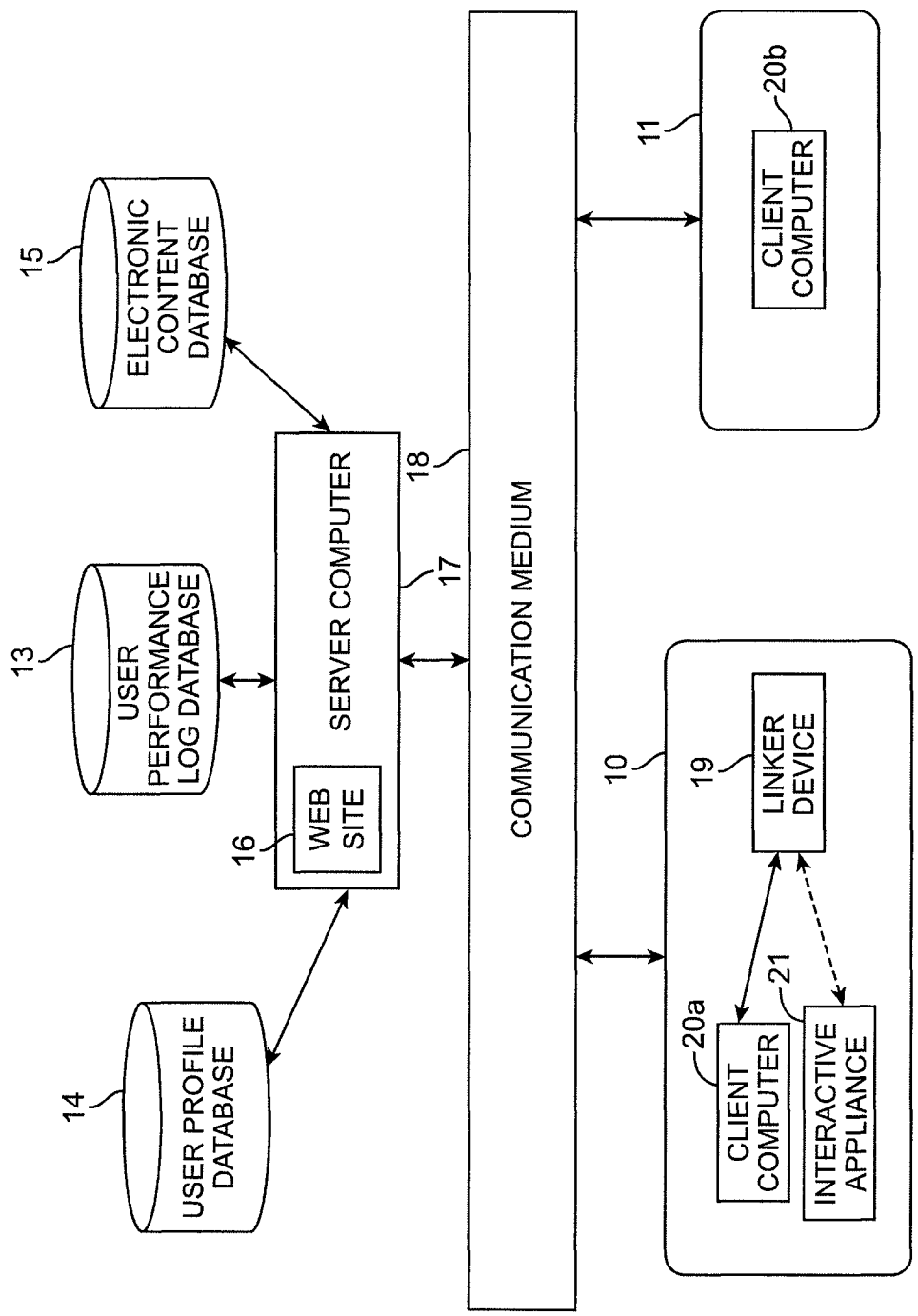
FIG. 1 shows a block diagram of a system according to an embodiment of the invention.

For purposes of illustration, the user may be an adult, a small child, a teenager or any other person of any suitable age. The user of the system and methods according to embodiments of the invention may or may not be the individuals who actually buy, own or use the learning appliances. For example, in embodiments of the invention, a parent can download content packages for use in a learning appliance that is used by a child.

In embodiments of the invention, a method for assisting a user in learning is provided. The method may comprise receiving performance information of a user after the user uses an interactive learning appliance adapted to educate the user about one or more predetermined subjects. Subjects which can be learned using embodiments of the invention are not limited and may include colors, number recognition, pronunciation, current events, songs, general math, algebra, subtraction, multiplication, division, fractions, decimals, geometry, science, geography, history, spelling, grammar, the names and sounds of musical instruments, people, places, nature, music, multi-part harmonies sports, letters, numbers, counting, social studies, etc.

The user performance information is generated by the user's use of the interactive learning appliance. Performance information is written to a user log file that is sent from a site where the user is present to a server computer. After the server computer receives the user log file, the server computer can create a content package using the user performance information and the user's personal profile. The created content package is then sent to the user preferably via the Internet. Once received, the user loads the content package into the interactive learning appliance to modify the operation of the appliance. The modified learning appliance then presents the contents of the content package (e.g., problems, facts, instruction, music, messages, etc.) to the user for consumption. Since the content for the content package is determined using the user's profile and/or previous performance information, the modified interactive learning appliance is specifically adapted to educate the user.

Over time, many log files can be uploaded to the server computer and many content packages can be downloaded and used in the interactive learning appliance. The characteristics of the content packages change as the user's intelligence and/or preferences change over time. When the content packages are used in the interactive learning appliance, the interactive learning appliance can also change and adapt over time so that the user experiences adaptive learning. Where the user is a child, for instance, adaptive learning occurs through a series of interactions between the child and the interactive learning appliance. As the child interacts with the interactive learning appliance over time, the interactive learning appliance builds a small user log documenting the child's current state of learning using certain performance information obtained from the interactive learning appliance. Using this performance information, the child is then placed in a "zone" for each skill tested.

Zone analysis and placement can occur at any suitable location. For example, zone analysis and placement can occur at the server computer, at the user's site (e.g., within the interactive learning appliance or at a client computer) or at both the user's site and the server computer. It is understood that any of the described zone analysis and placement methods described below can occur at the server computer, client computer and/or interactive learning appliance. In preferred embodiments, zone placement and analysis occurs at both the server computer and the interactive learning appliance. In these embodiments, the interactive learning appliance may contain a less complex or different version of the zone placement and analysis software used on the server computer. In addition, zone placement and analysis software residing in the interactive learning appliance preferably determines the user's zone much more quickly (but potentially less accurately) than the zoning software on the server computer. These embodiments are especially useful for a user who initially uses an interactive learning appliance and does not interact with the server computer. The user's zone can be determined very quickly, and the user will be challenged with problems that are suitable for his intelligence level or knowledge level in a very short period. Consequently, the user will not become disinterested with the interactive learning appliance even if the user has only used the interactive learning appliance for a brief period.

A typical interactive learning appliance can test many skills. For example, the learning appliance can test skills such as addition, subtraction, division and multiplication. The zones for a particular skill may be differentiated according to intellectual ability. Each skill tested may comprise multiple zones, and each zone may include a number of problems with a predetermined level of difficulty. For example, the problems in zone 1 may be easier than the problems in zone 2. A user may have a greater proficiency in one skill than another skill, and the user may be placed in different zones for different skills. For example, the user may be proficient in spelling, but may not be proficient in grammar and may be placed in zones 5 and 3 for these skills, respectively. In another example, the user may quickly learn one spelling rule, for example, the "i" before "e" rule, but have continuing trouble with a different spelling rule in the same zone, for example, the use of double consonants. As a result, the user may be presented with "i-e" problems from a higher zone than the zone from which double consonant problems are selected. Each skill may have any suitable number of zones. For instance, a skill such as adding may have 5, or even 10 or more different zones, where each successive zone has increasingly difficult sets of addition problems.

As the user uses the interactive learning appliance, performance information is generated. Performance information may relate to the particular responses provided by the user. Examples of performance information include the user's response latency, the frequency of correct and/or incorrect responses provided by the user, the correctness or incorrectness of the most recent responses provided by the user, the problem IDs (a problem ID is an identifier such as a numeric code for a particular problem) of the problems attempted by the user, and the types of problems attempted by the user.

In preferred embodiments, the user performance information includes information relating to errors made in the learning process. Error information can be used to create a content package. In a typical example, the user's errors from a previous interactive session (e.g., the time between two successive uploads of user log files) are analyzed before selecting problems for the content package. For example, after a user log file is received, the user's log file can be parsed to determine the percentage of correct and incorrect answers based on the total number of problems attempted. Each problem is marked in the user's log in a user performance log database as "used" (correct answer) or "tried" (incorrect answer). If an answer to a problem is incorrect, a counter for the error type associated with the problem is incremented.

A server computer may use the performance information (e.g., error information) in a raw, unanalyzed or manipulated form to create a content package with a prescriptive component for the user. For example, when creating a content package, each interaction between a child and the interactive learning appliance can be analyzed. An interaction may be, for example, a problem presentation and an answer from a user. The user's answers are analyzed and the most common errors are determined. A personal adaptive learning module (PALM) on a server computer can select appropriate problems to include in the content package, given the user's current zone and the user's common error information. For example, while parsing through the user log file, variables representing the frequency of various error types will be incremented whenever an incorrect answer is identified. The most frequent error types can be identified and this information may be used by a PALM to select problems for the content package. After they are selected, an ACP (automatic content packager) carefully organizes and sequences the problems in a content package for presentation to the user. Depending on the available memory or other constraints, the number of error types may be more or less than three.

At the same or different time, an update module reviews the state of the user's zone based on the user's recent responses and may update the zone if certain criteria are met. The criteria may be that the user answers enough problems correctly before advancing to the next zone or answer enough problems incorrectly before the child is put in a lower zone. In some embodiments, the number of problems which the user answers incorrectly or correctly before moving to a lower or higher zone may be statistically significant. For example, the zone can be incremented if a child has answered at least 50% of the problems correctly and has attempted at least 5 problems within the zone. If less than 5 problems in the current zone have been attempted, the current zone is maintained. If the percentage of correct responses falls below 50% and more than 5 problems have been attempted, the zone can be decremented. In another example, the zone can be incremented if a child has answered at least 80% of the problems correctly and has attempted at least 20 problems within the zone. If less than 20 problems in the current zone have been attempted, the current zone is maintained. If the percentage of correct responses falls below 80% and more than 20 problems have been attempted, the zone can be decremented.

Computer programs residing on the server computer can analyze the data in the uploaded user log file, produce reports for the child, parents and teachers, and make determinations about what additional content should be downloaded to the user's interactive learning appliance to continue the learning process. The reports may be viewed in a user interface on a Web site or may be downloaded to the user's site for viewing, and may include graphs, tables, charts, or symbols (e.g., letter grades) representing the user's performance. The uploaded user log file may provide any information needed for reporting. For instance, the user's age and grade level may be in the user log file and can be used to prepare a report showing the user's performance as compared to others of like grade level or age. After the reports are viewed by other persons such as parents and teachers, they can upload their own content to the server computer and/or select content provided by the host entity on the host entity's Web site. The uploaded or selected content can be included in a subsequently created content package for the user, with or without content that is automatically selected by the server computer.

One or more competency matrices can be used to create content for each particular type of interactive learning appliance. The competency matrices organize and sequence the skills into appropriate levels to insure that problems are presented in the proper order of complexity. In embodiments of the invention, the competency matrices for each type of interactive learning appliance can form the "shell" within which the contents for the content packages are developed.

As noted above, any suitable subject (sometimes referred to as a knowledge domain) can be learned. The subject to be learned may be divided and subdivided in any suitable manner in the competency matrices. For example, the divisions or subdivisions of a subject may be labeled "skill areas," "topics," "skills," or "categories." In an exemplary embodiment, a math competency matrix may be organized into a number of skill areas. Exemplary skill areas in the math competency matrix may include "numbers" and "computation." The skill areas may be divided into topics such as "numerals", "number sense", "place value", "symbols", "addition", "subtraction", "multiplication", and "division". Each topic may be further divided into specific skills. An example of a specific skill under the topic "numerals" might be "identify numerals 1 to 12."

The competency matrices may be based on or correlated with standards advocated by leading organizations such as the National Council for Teachers or Mathematics, the National Council of Teachers of English, the National Council of Teachers of Social Studies or the Association for Supervision and Curriculum Development. After consulting published research and after interviewing experienced teachers, common errors made by students while learning these skills have been identified. These error types can be used in the adaptive assessment and content selection procedures and can provide a basis for reporting about the child's learning progress. Pedagogical strategies and principles are used to control the individual interactions (the micro level strategies) as well as the tracking and planning necessary to move from one learning level to another (macro level strategies).

FIG. 1 shows a system according to an embodiment of the invention. The system includes a location 10 where the user is present (i.e., a user site). At this location 10, a client computer 20(a) such as a personal computer can be operatively coupled to a linker device 19. The linker device 19 may be coupled to the client computer 20(a) through a wireless or a wired link (e.g., a cable). An interactive appliance 21 may be included in the system and may communicate with the client computer 20(a) via the linker device 19. In this example, the client computer 20(a) is shown as being separate and distinct from the interactive learning appliance 21. However, the client computer 20(a) could also be disposed within the interactive learning appliance 21 so that an intervening computer unit is not needed at the user's site to communicate with a remotely located server computer 17.

The linker device 19 may be any suitable device capable of transferring data between the client computer 20(a) and the interactive learning appliance 21. The linker device 19 could be, for example, a wireless transceiver such as a wireless RF (radio frequency) transceiver or an infrared transceiver. In preferred embodiments, however, the linker device 19 is a device that is capable of reading information from, and writing information to, the transferable information storage medium. In a typical embodiment, the transferable information storage medium may be a cartridge that can be inserted into both the linker device 19 and the interactive appliance 21. Preferably, the transferable information storage medium can be inserted within many different types of interactive learning appliances. For example, the transferable information storage medium may be inserted into a cylindrically shaped interactive learning appliance or into an interactive learning appliance in the form of a child's laptop computer. A user may thus own many different types of interactive learning appliances, while using one linker device and one transferable information storage medium.

The transferable information storage medium may be in any suitable form. For instance, the transferable information storage medium may be a cartridge, a disk, a tape or a memory stick. Cartridges are especially desirable since they can be easily manipulated and handled by children. Any suitable amount of storage space may be provided on the transferable information storage medium. Preferably, the capacity of the information storage medium is at least about 512 Kb.

A server computer 17 including data representing a Web site 16 can be in operative communication with the client computer 20(a) at the user's site 10. The Web pages of the Web site 16 may include any number of interactive features including any suitable number of hyperlinks to help guide the user through the Web site 16. The Web site 16 may also have a number of graphical user interfaces for the user to input information such as his name, grade, preferences, etc. into the system. A browser on the client computers 20(a), 20(b) in communication with the server computer 17 permits the user or others to view the Web site 16 and pages thereof. Examples of suitable browsers include Internet Explorer™ and Firefox™ that are commercially available from Microsoft and Mozilla respectively. Access to the Web site 16, and in particular to the user's information (e.g., profile information), may be restricted by requiring that any visitors enter an identifier (e.g., a password) to show that the persons accessing the information have proper authorization.

The user or other persons may contact the Web site 16 to obtain information or upload information. In some embodiments, the server computer 17 can generate reports for particular users. These reports can be viewed on the Web site 16 by parents, teachers or others using the client computers 20(a), 20(b). Parents, teachers or others can request that the reports be sent through some other mode of delivery (e.g., e-mail or regular mail). At the Web site 16, they can also use the user interface to select content provided by a host entity or may choose or upload their own content to be included in a content package for particular users of the interactive learning appliance 21. The selected or uploaded content may be used with or without a prescriptive component, and with or without automatically selected content in the content package. Advantageously, embodiments of the invention provide users with a great deal of flexibility. The user, other persons or the server computer may modify or create a content package for the user's interactive learning appliance so that it is tailored for the user.

The server computer 17 is typically a powerful computer or cluster of computers. For example, the server computer 17 can be a large mainframe, a minicomputer cluster or a group of servers functioning as a unit. In one example, the server computer may be a database server coupled to a Web server. Moreover, the server computer 17 can behave as a single computer that services the requests of one or more client computers. Client computers, such as the client computers 20(a), 20(b) shown in FIG. 1 can communicate with the server computer 17 through the Internet and optionally through one or more Internet Service Providers (ISPs) (not shown). The client computers 20(*a*), 20(*b*) typically have less memory and less computing power than the server computer 17.

The server computer 17 may have access to one or more databases of information. As shown in FIG. 1, the server computer 17 may have access to a user profile database 14, a user performance log database 13 and an electronic content database 15. Although the databases are shown as being distinct entities, they may be combined in some instances. For instance, a user's profile and the user's performance log may be cataloged under the user's name or other user identifier in a single database. The user profile database 14 may include the user's personal preferences and information about the user. Exemplary user profile information may include information such the user's age, hobbies, address, phone number, e-mail address, school, favorite subjects, relatives, teachers, favorite songs, favorite sports, favorite foods, favorite cartoons, etc.

Information in the performance log database 13 and the user profile database 14 can be used to select problems that the user can more easily identify with and will more likely attempt. For example, if a user has expressed an interest in baseball, then math problems and word problems relating to baseball can be selected and included in the content package. Since the selected problems pertain to subject matter that the user can easily identify with and address the user's deficiencies, they will keep the interest of the user while helping the user overcome any deficiencies.

The user performance log database 13 may include a record of the user's past interactions with the interactive learning appliance 21. For example, the database can contain a user's performance log, which documents the user's interaction with the interactive learning appliance 21 over a lengthy period. It may contain a more comprehensive record of the user's interaction history than the user log file on the interactive learning appliance. The user log file on the interactive learning appliance may primarily document the user's interaction history between successive log file uploads to the server computer. The user log on the database 13 may contain a record of all problems that the user has attempted with the interactive learning appliance. Problems may be marked "tried," "new" or "used" in the user's performance log in the database 13. Information in the user's performance log can be used to select appropriate problems, facts, etc. for a content package for the user. For instance, when the server computer 17 analyzes the user log, the number of problems marked "used" may be reduced in the created content package or may not be included in the content package. The user performance log database 13 may also contain reports relating to the user's performance. For example, graphs illustrating the user's performance over time can be present in the user performance log database 13.

The electronic content database 15 may include any suitable content which can be included in the content package. The content may be in the form of static information, dynamic information, sound files, video files, applications, etc. The content may include problems (e.g., questions, puzzles, riddles, quizzes), as well as songs, games, hints, music, facts, greetings, and messages (e.g., help, encouragement, or error messages).

The system, and especially the server computer 17, can include one or more computer programs, written in any suitable computer language. For example, first, second, and third computer programs used for performing three different functions can be embodied in a single computer program having one or more subroutines, or may be embodied by three separate and distinct computer programs. In embodiments of the invention, for instance, the server computer 17 may have one or more computer programs to: generate a user interface, generate a summary usage report, update a user profile in a user profile database, update a user's performance log in a performance log database, retrieve data from any suitable database and send data to any person. One or more computer programs may also be provided to analyze a log file obtained from a user, select content for and assemble a content package for the user, and send the content package to the user.

The server computer 17 and the client computers 20(*a*), 20(*b*) communicate through a communication medium such as the Internet, and more particularly the World Wide Web (WWW). Typical communication protocols include HTTP (hypertext transfer protocol) and TCP/IP (terminal communication protocol/internet protocol). Some sites may include a client computer 20(*b*) without a corresponding interactive appliance 21. For example, a teacher, a parent, or other individual may use a user interface on the Web site 16 to view a report relating to a user's performance, or may upload content such as problems, questions, or facts to the Web site 16 so that the content can be included in a content package for the user.

By working together, the server computer 17 and the interactive learning appliance 21 can provide a greater variety of content to the user than would otherwise be the case. For instance, in embodiments of the invention, over 25,000 spelling words can be present on the electronic content database 15 and can be available for use in content packages. Such vast access to spelling words is not available on conventional interactive learning appliances. Moreover, the content in the content database 15 can be easily updated or supplemented by a host entity. Information can be updated and subjects such as current events can be readily tested. This is not available with typical conventional interactive learning appliances, because access to additional information is limited.

Figure 2:
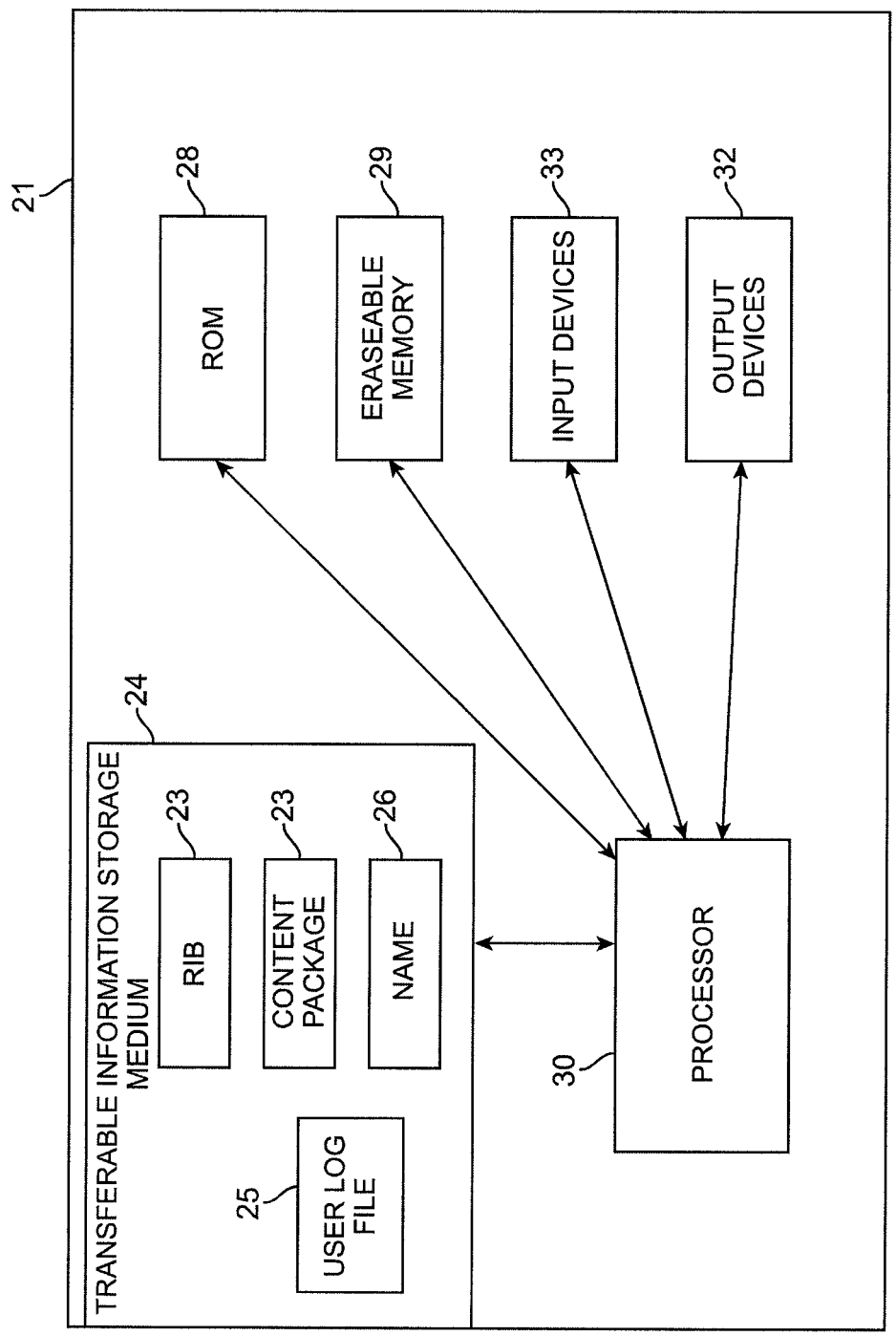
FIG. 2 shows a block diagram of an interactive learning appliance according to an embodiment of the invention.

FIG. 2 shows a block diagram showing some components of an interactive learning appliance 21. The interactive learning appliance 21 may be in any suitable form. For example, the interactive learning appliance 21 may be cylindrically shaped or shaped as a platform. The cylindrically shaped interactive learning appliances preferably have at least one ring that rotates around a cylindrical body. The ring can be used to select problems, subject areas and answers and may act as a rotating switch. In some embodiments, the interactive learning appliance can be in the form of a child's representation of an adult object. For instance, in some embodiments, the interactive learning appliance can be in the form of a child's laptop computer or a child's compact disk player (e.g., a "boom-box"). Children's representations of adult objects typically have brighter colors and/or larger buttons than corresponding adult objects. An interactive learning appliance 21 for the child may also have pictures or three-dimensional figurines of animated or moveable characters. The interactive learning appliance 21 may be considered an educational toy in some embodiments.

The interactive learning appliance 21 may comprise a housing (not shown) which may house a processor 30 such as a microprocessor, a read only memory (ROM), an erasable memory 29, one or more input devices 33 for the user to input information, and one or more output devices 32 for the user to receive information 32. Suitable input devices may include any suitable combination of buttons, switches, speech recognizers, alphanumeric keypads or keyboards, selection devices such as styluses, and rotary switches such as rings that can be used to select certain information (e.g., numbers, letters). Suitable output devices include speakers, visual display screens (e.g., LCD screens), vibration sensors, etc. The ROM 28, the erasable memory 29, the input devices 33 and the output device 32 may all be in operative communication with the processor 30. The ROM 28 may include content such as music, sounds and phrases that can be used with any of the downloaded content packages. It may also include a number of questions that may make up the "base content" for the interactive learning appliance. This base content can be pre-loaded into the interactive learning appliance so that the user need not download any content before using a new interactive learning appliance. A speech synthesizer chip or music generator (not shown) may also be included in the interactive learning appliance. The speech synthesizer chip can provide a human voice to the interactive learning appliance to guide, help, or encourage the user in learning. Batteries or a power cord may supply power to the interactive learning appliance 21. Other specific features of various interactive learning appliance embodiments can be found in U.S. Provisional Patent Application No. 60/181,967 filed Feb. 10, 2000, which is herein incorporated by reference.

Although information can be entered into the interactive learning appliance 21 using traditional means such as a keyboard or a touchpad, information can be entered in other ways. For example, in some embodiments, the interactive learning appliance 21 can be a hand-held device. An exterior dimension of the hand-held interactive learning appliance 21 can be used to measure objects. The hand-held interactive learning appliance 21 can be manipulated to measure an object and measurement information can be automatically entered into the appliance 21. For example, the appliance 21 may be in the form of a cylinder with a length and a diameter. A user may measure the length of an object by rotating the appliance 21 in a lengthwise direction and the number of rotations can be automatically entered into the appliance 21 using an internal rotation sensor and recorded. When the number of recorded rotations is multiplied by the known length of the appliance 21, the length of the measured object can be determined. For instance, the user can be asked by the appliance 21 to measure the length of his leg. The user may take his appliance 21 and rotate the appliance 21 in a lengthwise direction in an end-over-end fashion over his leg. The length of the leg may be equal to three lengths of the appliance 21 and this information can be automatically entered into the appliance 21. Accordingly, in embodiments of the invention, the entire interactive learning appliance can be physically manipulated to obtain and automatically enter information into it. In addition to mentally interacting with the interactive learning application (e.g., by answering questions posed by the appliance), the user can physically interact with the interactive learning appliance 21. When a user such as a child is able to interact physically with an appliance, the child is more likely to use the interactive learning appliance and remember any experience with the interactive learning appliance.

The interactive learning appliance 21 may also include a transferable information storage medium 24 which may contain a user log file 25, a RIB (Read-only memory Information Block) 23, a content package 23, and a name file 26. The RIB 23 can be a directory for the information storage medium 24. For example, the RIB 23 may contain information relating to the types of information stored and the location of the stored information on the transferable information storage medium 24. The RIB 23 (or other portion) may also include security information used when transferring data over the Internet. The content package 23 may include applications, information, problems (e.g., questions), games, etc. in static or dynamic form. Lastly, the name file 26 can include personal information about the user. For example, the name file 26 may include a personalized audio greeting for the user, an identifier for the interactive learning appliance being used, passwords, etc.

Preferably, the housing of the interactive learning appliance 21 is made of plastic and is cooperatively structured to receive the transferable information storage medium 24. For example, the housing may include a recess for a memory cartridge containing a user log file. The processor 30 can write data to the information storage medium 24 or read data therefrom. The processor 30 may also send information to the ROM 28 or the erasable memory 29.

Information such as questions, words, pictures, musical sounds, applications, etc. may be stored in libraries of code, libraries of resources, and libraries of applications in the interactive learning appliance. Information such as this may be stored once in an interactive learning appliance (e.g., in a ROM), and may be accessed according to set of instructions provided to the processor. Sets of instructions for manipulating data, rather than the data files themselves, can be quickly transferred to an interactive learning appliance and stored in memory. Large data files such as sound and image files need not be repeatedly transferred to and from the interactive learning appliance. Rather, small instruction files may be transferred, thus resulting in faster data transfer and lower memory capacity requirements. Music data, for example, may be transferred to and from the interactive learning appliance according to a MIDI (Musical Instrument Digital Interface) or MIDI-like protocol.

In embodiments of the invention, zone adjustment can occur while the user is using the interactive learning appliance and/or after the user's log file is uploaded to the server computer. The interactive learning appliance 21 may also include appropriate software to identify a particular zone for the user as the user is using the device. Zone determination can occur using the processes described below with reference to FIGS. 4A to 4D. As will be explained in further detail below, in these embodiments, the user answers a certain percentage (e.g., 50, 60, 70, or 80% or more) of questions right or wrong in a zone before their current zone is incremented or decremented. When the user's log file is uploaded to the server computer, a much more thorough zone analysis and determination can take place. The zone determination method used by the server computer can be characterized as a standard zone-determining method.

In addition to the standard zone-determining method, a "fast-track" version can be used in the system. A fast-track version can be used when the user has not been previously placed into a zone. To place the user into the correct zone as quickly as possible, the fast-track version tests the user on a smaller number of problems than in the standard zone determining method. Typically, a user begins using the device without an assigned zone and the fast-track version is used to determine quickly the user's zone. If the user has not moved zones within a predetermined time or after attempting a predetermined number of problems, the interactive learning appliance can switch from a fast-track mode to a standard zone determining mode. As long as the user keeps moving between different zones before he is asked a predetermined number of questions, the fast track version remains operative. Once the user switches to a standard zone determining mode, it is assumed that the user is in approximately the correct zone.

Other techniques can be used to determine the user's zone. For example, in one embodiment, the current zone can be incremented or decremented when a predetermined number of problems are respectively answered correctly or incorrectly in a row. For example, at least 3 (e.g., 3, 4, or 5) correct or incorrect answers in a row may increment or decrement the user's zone, regardless of the percentage of correct or incorrect answers actually achieved in the zone. Successive incorrect or correct answers can indicate a trend in the user's performance, and can indicate that the current zone is not optimally suited for the user. The zone can be quickly adjusted upward or downward without requiring the user to finish all problems in the zone, thus saving the user from having to answer a large number of problems that the user is clearly capable or incapable of answering. For example, a zone may contain 100 problems and the standard zone determining method may require the user to answer 80 problems (e.g. 80%) correctly before moving up one zone. In a fast-track version, 10 correct answers in a row can quickly indicate that the questions are too easy for the user and the user can move up one zone without having to answer the remaining 70 problems before advancing to the next zone.

Figure 3:
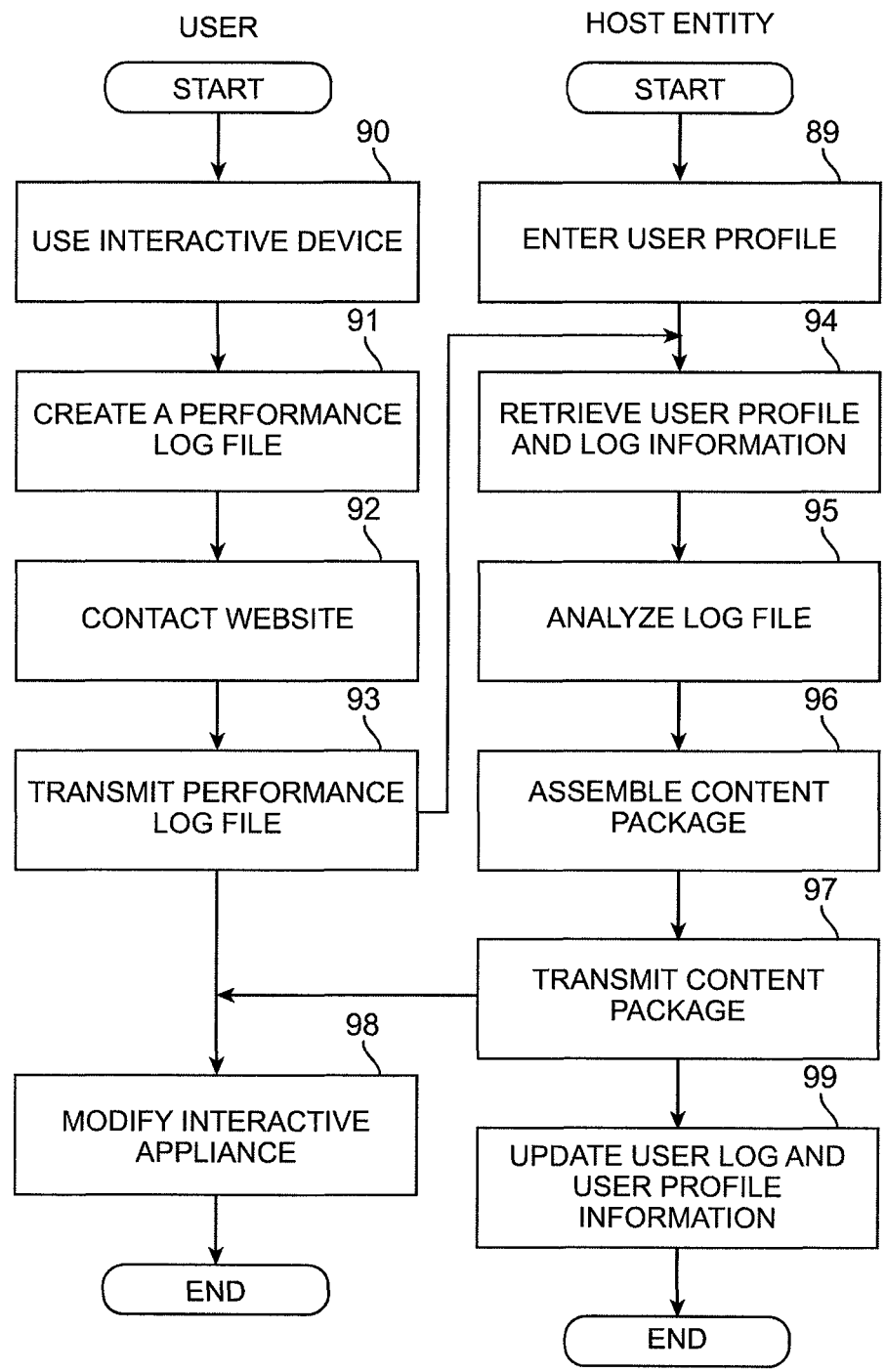
FIG. 3 shows a flowchart that illustrates the interaction between the user and a host entity in an embodiment of the invention.

Embodiments of the invention can be described with reference to FIGS. 1 and 3. First, a user at a user site 10 uses an interactive learning appliance 21 (step 90). As the user uses the interactive learning appliance 21, a user performance log file is updated or created in the interactive learning appliance 21 (step 91). After the user has used the interactive learning appliance 21, the user removes a transferable information storage medium (not shown) containing the user performance log file from the interactive learning appliance 21. The transferable information storage medium is then inserted into a linker device 19 coupled to a client computer 20(*a*). Using the client computer 20(*a*), the user contacts a host entity's Web site 16 (step 92). For example, the uniform resource locator (URL) for the Web site 16 can be entered manually or automatically into the client computer 20(*a*) and the pages of the Web site 16 may be returned to the user's client computer 20(*a*). Once contact is made, a Web page displays a personal greeting ("Hi Dan!") to the user and the user performance log file is transferred from the linker device 19 to the client computer 20(*a*). The log file is then uploaded from the client computer 20(*a*) to the server computer 17 operating the Web site 16 via a communication medium 18 such as the Internet (step 93). At some time, the user's profile may be entered into the user profile database 14 (step 89). User profile information can be uploaded to the server computer 17 and then transmitted to the user profile database 14, or the user profile information may be sent to the host entity (e.g., through regular mail) and may be entered into the user profile database 14 by the host entity.

Once the user performance log file is received by the server computer 17, the server computer 17 retrieves user profile information from a user profile database 14 and also retrieves information relating to the user's past performance from a user performance log database 13 (step 94). Using the retrieved information, a PALM module on the server computer 17 analyzes the log file (step 95). Using the analyzed information, the PALM module on the server computer 17 can retrieve electronic content such as problems, facts and questions, from an electronic database 15. The particular content used to form the content package can be chosen in accordance with information in the user's profile (e.g., the user's preferences) and/or can be chosen in accordance with the user's past performance. For example, if past performance indicates that the user is not proficient in multiplication and the user's profile indicates that the user likes to do word problems, then a greater percentage of word problems teaching multiplication can be included in the content package.

A content package is then created by the server computer 17 after the log file is analyzed (step 96). Then, the created content package is then transmitted (e.g., downloaded) to the client computer 20(*a*) at the user's site 10 and is written to the transferable information storage medium disposed in the linker device 19 (step 97). After the content package is transferred to the information storage medium, the information storage medium is then removed from the linker device 19 and is inserted into the interactive learning appliance 21, and the content package modifies the interactive learning appliance (step 98).

After or before the download of the content package is complete, the user's performance log information and user profile information may be updated in the appropriate database 13, 14. For instance, problems that the user answered incorrectly can be marked "tried" in the user's performance log in the user performance log database. These problems can be included in a subsequently created content package to re-test the user on problems that he previously answered incorrectly.

If desired, reports of the user's performance and progress can be generated. These reports may be accessed by another person such as a teacher, parent or grandparent using a client computer 20(*b*). The person can contact the host entity's Web site 16 and may view or download the user's report. In some embodiments, reports can be automatically sent to the user or other persons. For instance, the server computer 17 can automatically e-mail a report to the user's parents or teachers after the user log file is uploaded and analyzed. The user or other persons may also upload content such as problems, applications, comments or messages to the server computer 17 for storage in the electronic content database 15. This content can be included in a subsequently created content package for the user.

Participation by parents and teachers in the learning process can help to ensure that the child receives appropriate reinforcement or guidance from others. Parents and teachers, for example, can supplement the child's learning process by providing the child with additional or different educational material to supplement what the child has learned using the learning appliance. For example, after viewing a child's report on a Web site, a teacher can identify areas where the child may have particular difficulty. The teacher can then use any suitable non-electronic forms (e.g., lectures, flashcards, textbooks, etc.) of teaching to assist the child in learning about a given subject. In another example, in a classroom situation, a student may perform homework on a cartridge-containing interactive learning appliance at home. Answers to the homework can be recorded on the cartridge. Then, the student may bring the cartridge containing the logged answers to class each morning. Using appropriate computer equipment, the teacher could obtain printouts of the student's answers or view the student's answers on a display screen. Depending on the student's results, the teacher could select a particular lesson that had been previously uploaded by the teacher or other person, or could allow the student to continue using the adaptive interactive learning appliance. Advantageously, embodiments of the invention can analyze the user's performance and can provide prescriptive content to the user to address any difficulties that he may be having, while allowing persons such as parents and teachers to participate in the process.

The content package can include a mixture of problems. The mixture of problems may contain problems selected from different zones. Preferably, at least 50% of the problems in the content package are selected at the user's current zone, and less than 50% of the problems are selected from zones higher and/or lower than the user's current zone. For example, problems can be selected from the user's current zone, one or more zones with more difficult problems than the current (e.g., a higher zone) and/or, one or more zones with less difficult problems than the current zone (e.g., a lower zone). The content package received by the user can include a mixture of problems which can serve to challenge the user at a higher level (e.g., the more difficult problems), challenge the user at his current intellectual level, and encourage the user by providing the user with a certain number of easier problems (e.g., from a lower zone). Accordingly, the problems in the content package can be centered on the user's present intellectual level, while providing a sufficient number of problems to challenge and encourage the user to continue using the interactive learning appliance.

When visiting the host entity's Web site 16, the user or other person may select specific problems for the content package, or may request that only certain types of problems be included in the content package using the user interface. Selectable problems may be provided by the host entity or may have been uploaded by a person. These problems can be displayed on the host entity's Web site for selection by the user or another person. For example, when visiting the host entity's Web site, the user can request that only problems pertaining to "sports history" be included in the content package by selecting a "sports history" button on the Web site. The server computer may then only select problems that pertain to sports history. In another example, the user may use the user interface to select individual sports history problems on the Web site for inclusion in the content package.

Problems can be selected from any suitable zone (e.g., the user's current zone) using information obtained in an analysis of the user's errors. For example, after analyzing the user's log file, a program in the server computer can determine what common types of errors the user is making, and can thus identify the user's deficiencies. The user's deficiencies can be addressed by selecting a number of problems directed to the errors that the user is making and these problems can be included in the content package. Consequently, the content package that is sent to the user can include a prescriptive component that will specifically address the user's deficiencies.

Figure 4A:
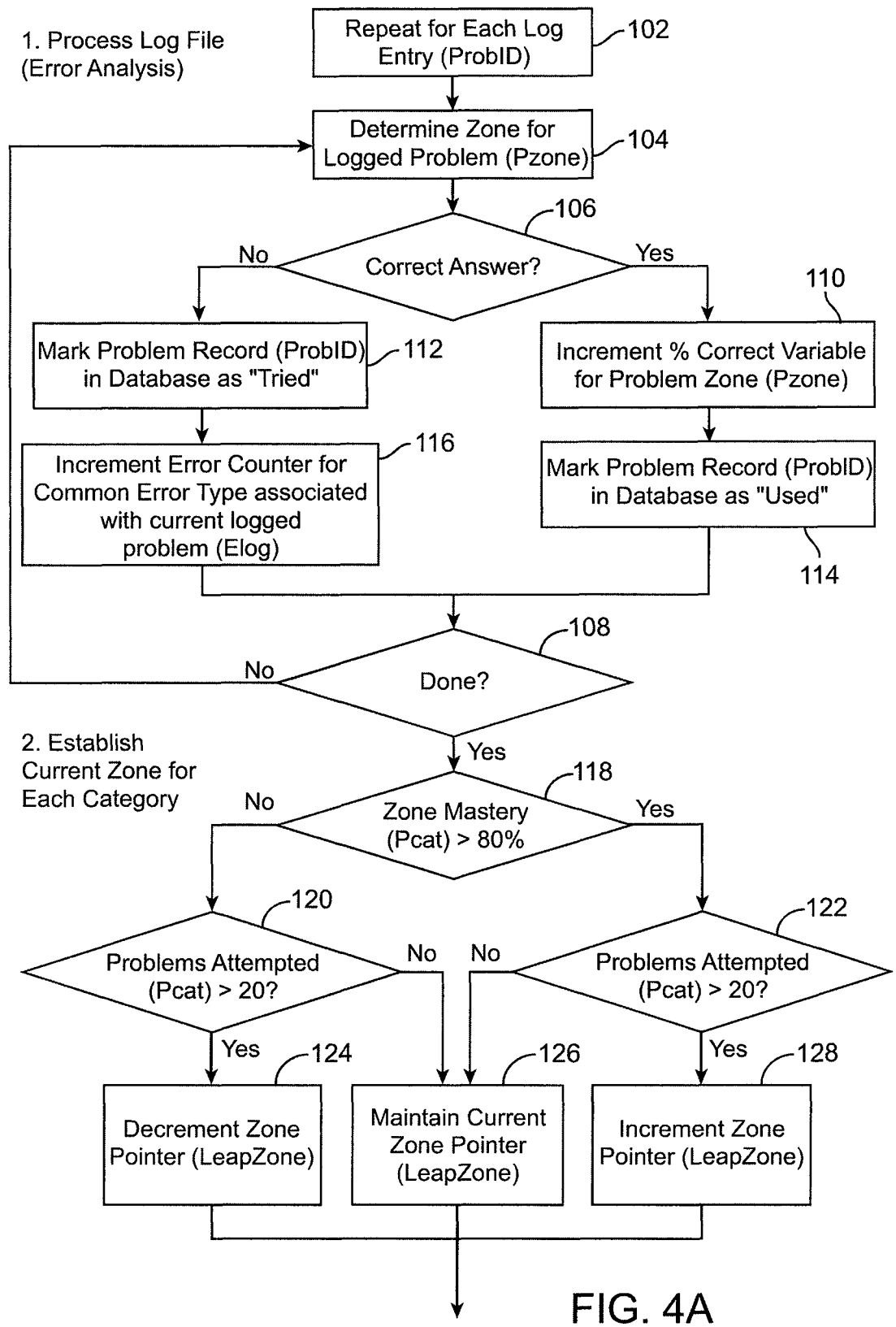
FIGS. 4A to 4C show flowcharts that illustrate an exemplary process for analyzing a user log file and creating a content package.

Embodiments that show how a content package including a mixture of problems can be described with reference to FIGS. 4A to 4C. In this embodiment, a user log file is analyzed and a content package is created for a user. With reference to FIG. 4A, a log file can be processed by a server computer and an error analysis can be conducted. A log entry having an associated problem ID and a response from the user can be read (step 102). Once the problem ID is determined, the corresponding zone for that problem is determined (step 104).

A determination is then made as to whether the response provided by the user is correct (step 106). If the answer to the particular problem is correct, then a percent correct variable for the problem zone 110 is incremented (step 110). The problem record is marked in the user's problem record as "used" (step 114). If the answer to the particular problem is incorrect, then the percent correct variable for the problem zone is not incremented. The problem record for the user is marked as "tried" for that problem (step 112), and an error counter for common error types associated with the particular problem is incremented (step 116). A determination is then made as to whether the error analysis is completed (step 108). If more problems are to be analyzed, the error analysis process can be repeated for these problems.

After a determination is made as to whether a problem or group of problems has been correctly or incorrectly answered by the user, a determination is made as to whether the user has mastered the current zone (e.g., Pcat). In this particular example, a determination is made as to whether the user has answered at least 80% of the problems for the zone correctly (step 118). If the user has answered at least 80% of the questions correctly, a determination is made as to whether the number of problems attempted in the particular category (i.e., skill) is greater than 20 (step 122). If the user has attempted more than 20 problems, then the user is attempted a sufficient number of problems and the zone for the user is incremented (step 128). If the user has not attempted more than 20 problems, then the current zone is maintained for the user. If the user has answered less than 80% of the questions correctly, then a determination is made as to whether more than 20 problems have been attempted. If more than 20 problems have been attempted, then the zone is decremented (step 124). If 20 problems or less have been attempted, then the current zone is maintained for the user (step 126).

In some embodiments, the criteria used to determine whether a user advances in a zone or not may change for each content package sent to the user. For instance, if particular problems are to be selected from a particular zone and the zone has a small number of problems, then the number of problems that the user has to answer correctly before advancing out of the zone may be less than if there were a larger number of problems available in the zone. This might be done so that the small number of problems within the zone is not repeatedly presented to the user and the user is presented with new problems.

Figure 4B:
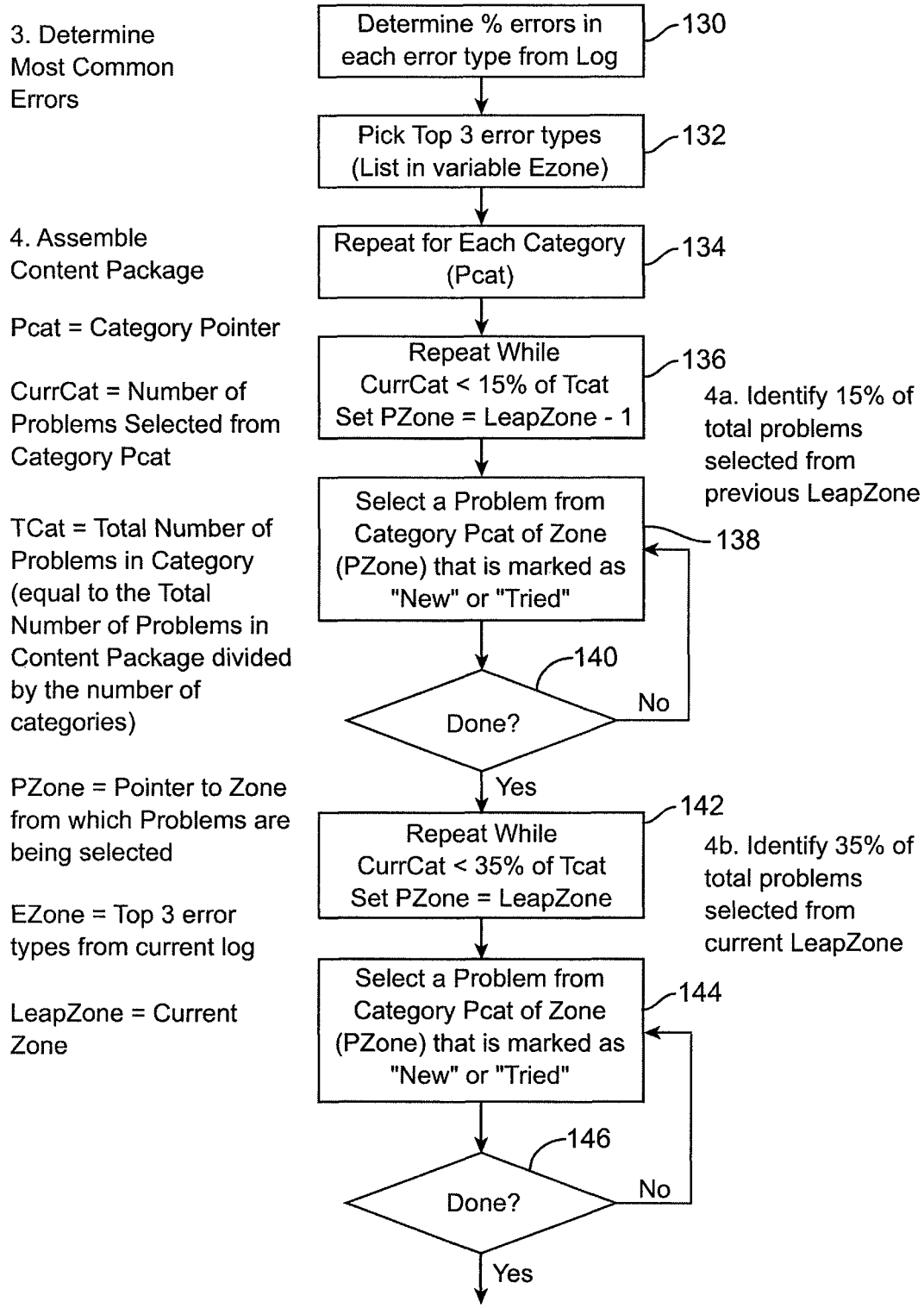
Figures 4C, 4D:
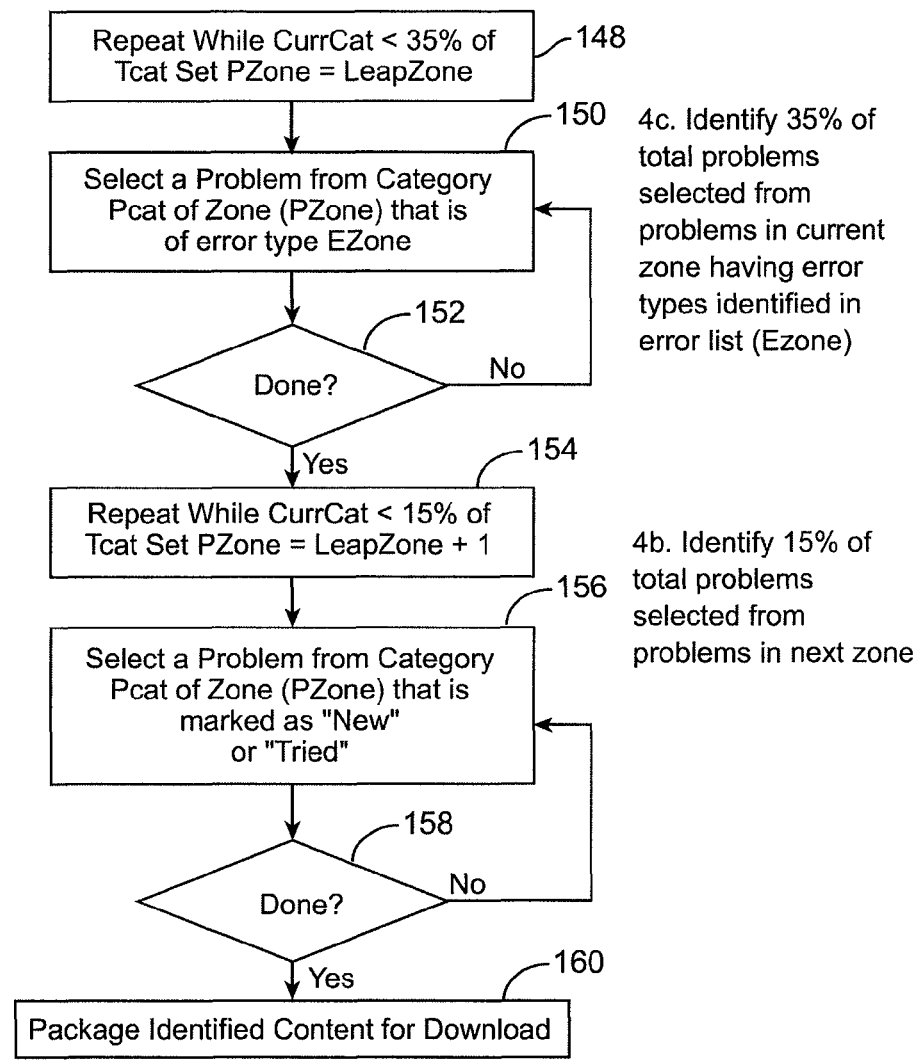
FIG. 4D shows a block diagram of the components of a content package created according to the process shown in FIGS. 4A to 4C.

With reference to FIG. 4B, once the zone is established for the user, a determination of the percentage of errors in each error type can be made (step 130). The top three error types are then determined (step 132). This process is repeated for each category (i.e., skill) (step 134). This information can then be used to assemble a content package particular to the user.

After error analysis, a content package is created for the user. In this example, 15% of the problems are selected from a lower zone with less difficult problems than the current zone distributed across all categories, 15% of the problems are selected from a higher zone with more difficult problems distributed across all categories, 35% of the problems are selected from the current zone with the most frequent common errors equally distributed across all categories in the zone, and 35% of the problems are selected from the current zone. These problems may be equally distributed across all problem categories in the zone and may optionally be selected using the identified common errors.

With reference to FIG. 4B, a zone pointer is set to a lower zone than the current zone and 15% of the total problems for the content package are selected from this lower zone (step 136). For each category, a problem is selected from those problems marked "new" or "tried" (step 138). This process is repeated until the target of 15% is reached (step 140).

Then, the zone pointer is set to the current zone so that 35% of the total problems for the content package are selected (step 142), e.g., without using the previously determined error information. "New" or "tried" problems are selected from the current zone categories until 35% of the total problems for the content package are selected (steps 144, 146).

After problems are selected from the current zone, additional problems from the current zone can be selected using the previously determined error information. In this example, 35% of the total problems in the content package will include these problems and the zone pointer is maintained at the current zone (step 148). Problems are selected from categories according to the identified error types (step 150) and this process is repeated until the number of problems equals about 35% of the total number of problems in the content package (step 152).

Last, the zone pointer is incremented to the next higher zone and problems equal to about 15% of the total number of problems in the content package are selected (step 154). "New" or "tried" problems are selected from the different categories within the zone and this process is repeated until the desired number of problems is selected (steps 156, 158). Once the content package is assembled, the content package is downloaded to the user (step 160).

Of course, any suitable variation of the processes described with reference to FIGS. 4A to 4D are encompassed in embodiments of the invention. For example, in some embodiments, steps to determine the most common errors (i.e., steps 130-132) need not be included in the creation of the content package. For example, the interactive learning appliance may be adapted to provide the user with a number of "fun facts" at varying levels of skill. A mixture of problems from different zones would be desirable so that the selected problems are not too hard or too easy for the user. A prescriptive component may or may not be included in these embodiments.

FIGS. 5A and 5B show a matrix for a math-based interactive learning appliance. Other matrices are disclosed in U.S. Provisional Patent Application No. 60/181,967 filed Feb. 10, 2000, which is herein incorporated by reference in its entirety for all purposes. The matrix shown in FIG. 5A lists topics such as "Numerals", "Place value", "Symbols", "Number sense", "Addition", "Subtraction", "Problem Solving", "Money", and "Time". Each topic can include various skills associated with it. For example, the topic "Number sense" has the skill "Identify missing number" associated with it. Each topic and skill can have an identification numbers (IDs) associated with them so that errors for these topics and skills can be tracked, tabulated, and/or analyzed for the above-described error analysis process. For example, with reference to FIG. 5A, a topic may be "Numerals" and a specific skill under this topic can be "Identify 1 to 12" (i.e. identify numbers from 1 to 12). These items can have ID numbers "2" and "3" respectively. As shown in FIG. 5A, the problems associated with the skill "Identify 1 to 12" may only be present in zone 1, while problems associated with the skill "Identify 1 to 100" can be present in zones 2 and 3. Once the user has correctly answered a predetermined number of "identify numbers from 1 to 12" problems correctly, the user is elevated from zone 1 to zone 2. Problems can then be selected from zone 2 when creating a content package. For example, a number of problems from the skills "Identify 1 to 100", "Identify 10's and 1's place," and "Recognize +−=" can be selected and put into the user's content package.

FIGS. 6A and 6B show examples of problems assigned to different levels. Other examples are provided in U.S. Provisional Patent Application No. 60/181,967. The different levels may correspond to different grades. For example, level 1 may correspond to the first grade, while level 2 may correspond to the second grade. As shown in FIG. 6A, the failure of a user to answer the problem "4, _, 6, 7" correctly may indicate a "counting error." If the user answers too many problems of this type wrong, this may indicate that the user is not proficient in counting. Using this information, problems and or help messages associated with teaching counting skills can be provided to the user in the content package to help overcome this deficiency.

Although many of the above-described embodiments relate to helping a user become educated about one or more specific subjects, embodiments of the invention can be used to assist a user in any suitable learning situation. Many types of games, for instance, only remain interesting if they increase in difficulty. Otherwise, once a user masters the principles specific to the game (for example in strategy games) or learns a limited set of facts through repetitive exposure (for example in a game like Trivial Pursuit™), the user can become bored. Embodiments such as the interactive learning appliance can be used to increase gradually the complexity level and degree of challenge presented in many types of games (including puzzle games similar to Myst™ or dexterity games like the GameBoy™ games). Similarly, the challenge level can be decreased if the user becomes overly frustrated. In preferred embodiments, content packages including content in zones that relate to various skill levels for various aspects of games may be downloaded to the user's interactive learning appliance. There are many things to learn in life other than academic subjects. The user can learn new paradigms by being exposed to various nonacademic challenges in the form one or more games. The user can learn the new paradigms as the user's skill increases when playing the games.

The interactive learning appliance and other embodiments can be used to teach music in addition to traditional academic subjects such as reading and arithmetic. The capability of the interactive learning appliance to produce many different types of high quality sound is particularly useful in providing music instruction. At a basic level, notes and their octaves can be produced, sequentially, then in unison. Next, the octave can be broken into an arpeggio, an eight-note or a five-note scale. Major, minor, blue and other scales can be taught. Harmony can be taught by playing an arpeggio in unison with the sounding of the tonic. The arpeggio can be displaced an octave so it sounds above or below the tonic. Multiple lines, voiced in instruments or vocal lines can be added to teach increasingly complex notions of harmony. Fundamental harmony can be taught by downloading the harmonic lines of songs in different channels. When the song is played on the interactive learning appliance, each line can be switched on or off. Consider for example, that the user downloads a performance of "The Saints Go Marching In." The melody line is played on a horn, a high harmonic line is played on a flute, a rhythm line is played on drums, a middle line is played on guitar and a continuous line is played on keyboard. The user can toggle a switch associated with each instrument to cause that instrument's line to sound or not. By singing along with each line, the user can learn how to create harmony and counterpoint. Depending on the zone of the user, more or less complex pieces can be provided in the content package. Additionally, the concept of tempering scales and non-western scales can be taught. Rhythm may also be taught using embodiments of the invention. A basic notion of fundamental beat can divided into two, three or four. More complex rhythms such as one instrument playing in four-four time while another plays in three-four time, or hemiola rhythms represent more complex, or higher-level zones. As a user masters a form of harmony or rhythm, the user can implement the new knowledge by manipulating the harmony or rhythm lines in specially available song elements. Internal lines can be made louder so they come out more, or displaced by a third or an octave in pitch. Songs can be rendered in different scales (e.g. minor, blue, pentatonic, etc.). The interactive learning appliance can be used as a music-teaching device that can use adaptive learning to teach harmony, rhythm, and other musical principles according to the skill of the user.

In other embodiments of the invention, a user using a user interface pre-selects one or more learning appliances from a group of learning appliances that are listed on a host site (e.g., a Web site). The host site may be accessible through an electronic communication medium such as the Internet. A server computer that runs the host site may then store the selected set of learning appliances under the user's profile in a personal profile database. The user or the user's family may own the selected set of learning appliances, and they may have been purchased by the user (or the user's family) prior to accessing the host site.

At a later time, the user interface may present the selected set of learning appliances to the user along with buttons for downloading content packages for each of the learning appliances in the selected set. Other learning appliances that the user did not previously select are not displayed. The user may then download a content package for a specific learning appliance. After downloading, the user may use the downloaded content package with the learning appliance.

Illustratively, a user may visit a Web site and use the user interface to register by providing appropriate identifier information (e.g., a username and password). After registering, the user interface may present the user with multiple electronic toys to the user in the form of a list. The user may then select, for example, a set of five electronic toys out of the group including twenty electronic toys. The five selected electronic toys may be first, second, third, fourth, and fifth electronic toys and may correspond to those electronic toys that are owned by the user and/or the user's family members. A server computer may then store the selected set of toys under the user's profile in a personal profile database in communication with a server computer that runs the Web site.

The user can then visit the same Web site at a later time. After the user has accessed the Web site, the user may input appropriate the identifier information into the appropriate identifier data fields so that the user is identified in the user interface. After the server computer running the Web site verifies the identity of the user, the server computer can automatically present the previously selected set of five electronic toys to the user on one or more Web pages or other suitable user interfaces. Sets of selectable buttons (e.g., buttons on one or more Web pages that are selectable with a mouse, trackball, or other device) are provided for each of the five toys to download content packages that are appropriate for the different toys. For example, for the first electronic toy, content packages A, B, and C may be presented user interface to the user for downloading. For the second electronic toy, content packages D, E, F and G may be presented to the user for downloading. The user may download one or more of the content packages for either the first toy or the second toy. After downloading a content package for the first electronic toy, for example, the user (or another person) may load the content package into the first electronic toy. The user (or another person) may then use the modified first electronic toy.

Presenting the user with a pre-selected list of learning appliances in a user interface has a number of advantages. For example, by allowing the user to pre-select different learning appliances and presenting those learning appliances to the user at a later time, the user need not page through a number of different Web pages each time the user wants to access the host site to receive content packages for the user's learning appliances. In addition, the user need not specifically search for each learning appliance that the user owns from among other learning appliances that the user does not own each time the user visits the host site. This reduces the amount of time that the user needs to spend trying to obtain the electronic content for his/her learning appliance. Often, it is a parent who is searching for new content to update the toys that are used by a young child. Obtaining electronic content is less difficult for the parent using embodiments of the invention than the previously described conventional Web site. For example, if a child has 10 different toys, the user need not search for 10 different toys to download 10 different content packages for the user. The user need only input the user's identifier information (e.g., a password and username), and the 10 toys that the user owns are automatically presented to the user along with different content packages that are available for the toys. The user need not page through 10 different screens and/or input 10 different search terms for the 10 different toys to find content packages for them. This reduces the amount of time and potentially the amount of frustration that a busy user (or parent of the user) might experience trying to update the content for the toys.

Figure 7:
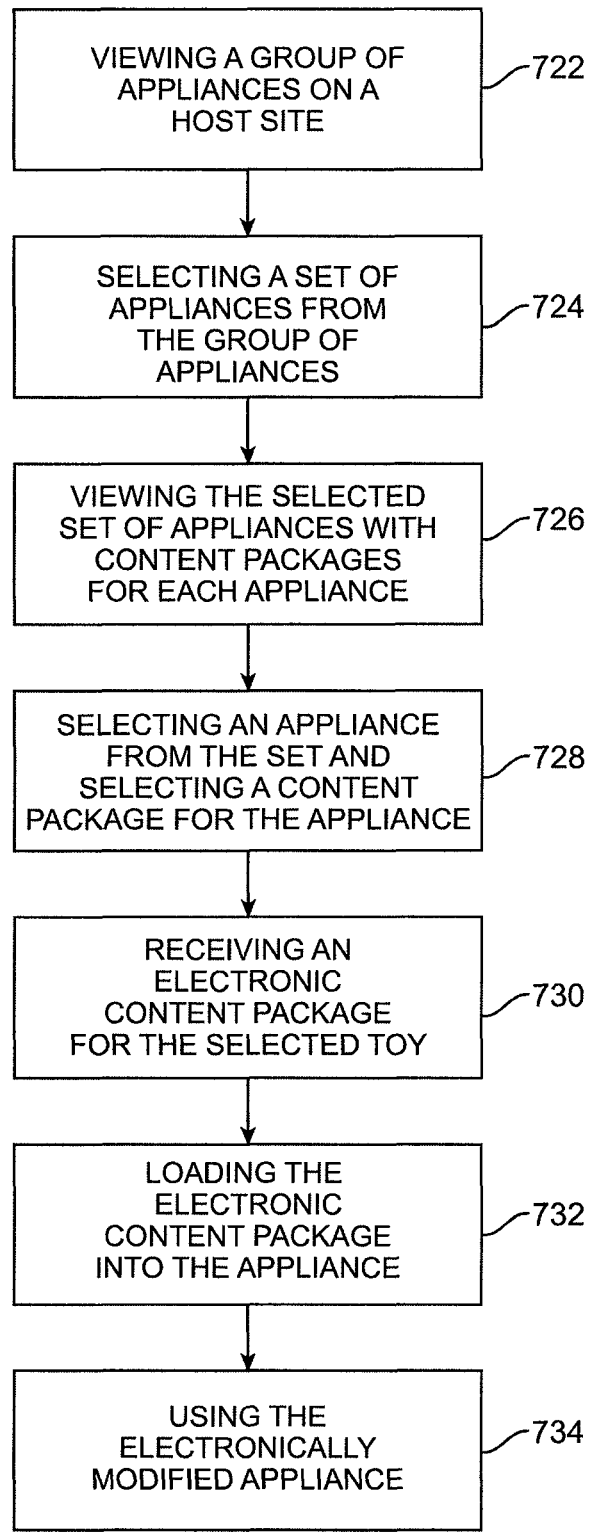
FIG. 7 shows a flowchart illustrating a method according to an embodiment of the invention.

FIG. 7 shows a flowchart illustrating a method according to an embodiment of the invention. The illustrated method includes viewing a group of learning appliances in a user interface (i.e. a Web page) (step 722). The user interface may be contained in a Web site that is run a server computer. A user may view the group of learning appliances using standard browser software running on a client computer (e.g., a personal computer).

Using the user interface, the user can then select one or more learning appliances from the group of learning appliances (step 724). Preferably, the user selects a set of learning appliances (i.e., two or more learning appliances) from the group of learning appliances. The one or more selected learning appliances may be owned by the user's family (e.g., a set of educational toys that are owned by two or more children in a family) or may be owned by a child in the family (e.g., a set of educational toys that are owned by a child in the family).

After the user selects the one or more learning appliances (while visiting the host site and while using a client computer), the server computer may store the selected learning appliances in a personal profile database under the user's profile.

After the server computer stores the selected learning appliances, the server computer may then present the selected set of learning appliances to the user along with one or more suggested content packages for each learning appliance. In a user interface, the user may then view the selected set of learning appliances on the user's client computer along with buttons for downloading the one or more content packages (step 726). Preferably, two or more content packages are provided for each learning appliance. The two or more content packages can form a predetermined learning curriculum.

Then, using the user interface, the user selects a learning appliance from the set of learning appliances and selects a content package for the learning appliance (step 728). The selection of the learning appliance and the selection of the content package may take place in a single step. For example, a user can select a learning appliance and a content package for it. When the user selects a button for downloading the content package for that particular learning appliance, the user selects both the content package and the learning appliance in a single step. After selecting the learning appliance and the content package, the user receives the content package (step 730). For example, after selecting a button for the content package on a Web page, the content package is downloaded to the user's client computer.

In the above-described embodiment, the user actively selects a button in a user interface to download a content package. In other embodiments, a passive process could be used. For example, in some embodiments, a server computer may e-mail content packages to the user on a periodic basis and the user may load the e-mailed content packages into the user's learning appliances and then use the modified learning appliances.

In some embodiments, the content packages may have been "prescribed" by a server computer in response to a person's past interaction with an electronic learning appliance. "Prescriptive" content packages are described in further detail in U.S. patent application Ser. Nos. 60/168,214, 60/181,967 and 09/632,424, all of which are herein incorporated by reference in their entirety for all purposes. As described therein, an electronic learning appliance may record a user's progress, and the record of the user's progress can be uploaded to a server computer. The server computer may then use the record of the user's performance to select content packages that address any subject areas that the user may need to address. The server computer may then present these prescriptive content packages to the user for downloading. As described in these patent applications, the electronic learning appliance may have appropriate software to adjust the intelligence of skill level of the user.

In some embodiments, the user's client computer may then store the content package that is received in a transferable information storage medium (e.g., a data cartridge). This transferable information storage medium containing the content package may then be inserted into a housing of the learning appliance and the content package can be loaded into the learning appliance (step 732). After loading the content package into the learning appliance, the user can use the electronically modified learning appliance (step 734). The learning appliance need not be in communication with the server computer or the communication medium in order to be used.

Figure 8:
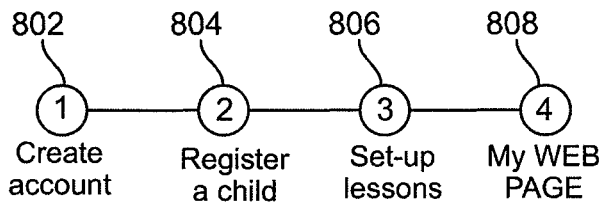
FIG. 8 shows a user interface where a person can create an account.
Figure 11:
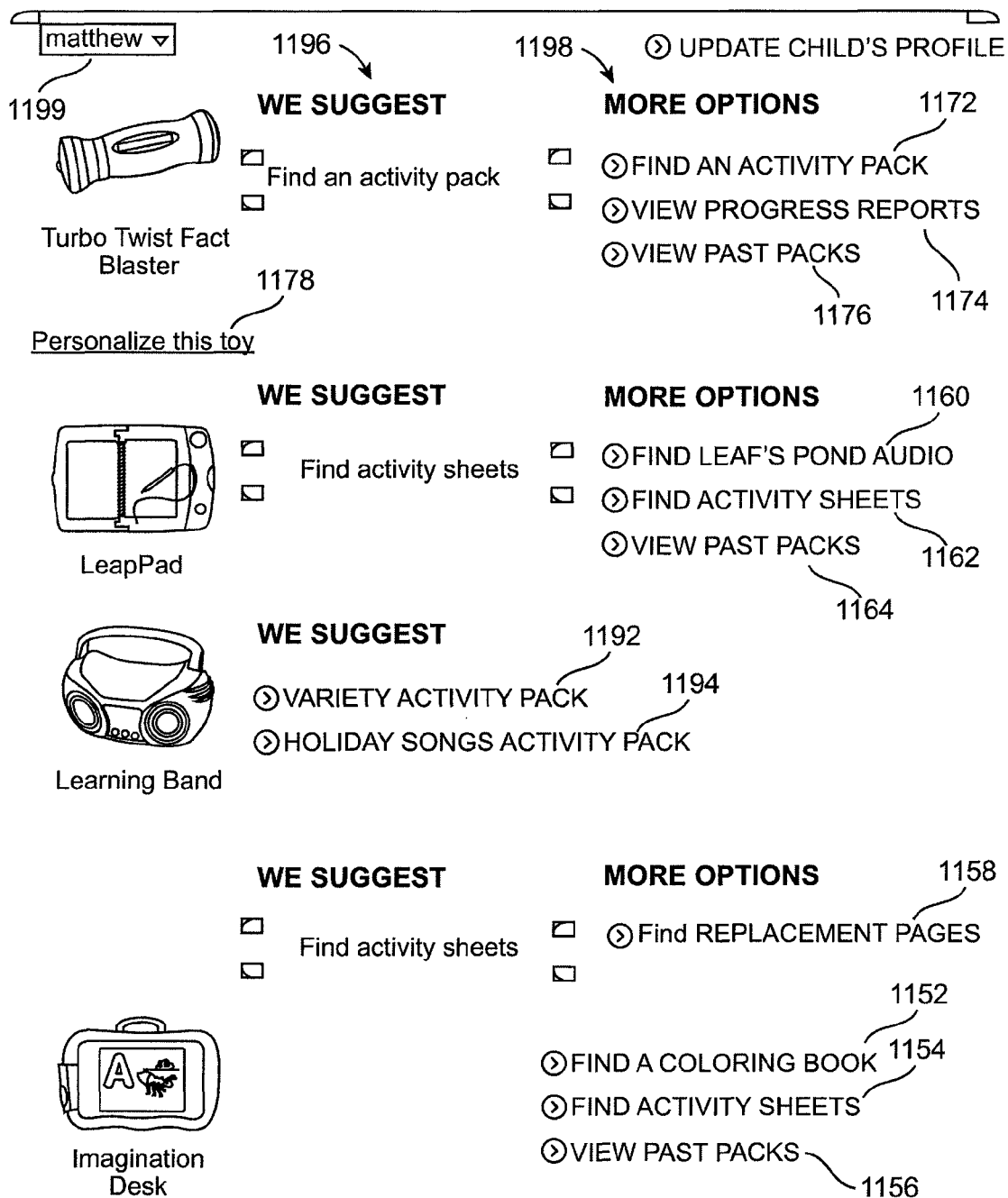
FIG. 11 shows a user interface showing toys that were previously selected, and showing buttons for obtaining content packages for each of the selected toys.

A number of user interfaces that can be presented to the user are shown in FIGS. 8 to 13. FIG. 8 shows Web page with a user interface where a user can register on a Web site. FIG. 9 shows a Web page with a user interface where the user can register the user's child's name, birthday and grade, and can select a set of toys from a group of toys. FIG. 10 shows a Web page with a user interface where a user can select from different lesson plans for the various electronic toys that a user's child may use. FIG. 11 shows a Web page with a user interface showing the set of toys previously selected, along with descriptions of various content packages that can be downloaded for each of the toys in the set. FIGS. 12 and 13 show Web pages with user interfaces with buttons for downloading content packages that can be used with a toy called the Imagination Desk™. Each of the Web pages with user interfaces shown in FIGS. 8-13 is described in further detail below, with additional reference to FIGS. 1 and 7.

Referring to FIG. 1, a user (e.g., an adult or a child) at a client location 10 may use the client computer 20*a* to contact the server computer 17 via the communication medium 18 and access the Web site 16. After the user has accessed the Web site 16, the user may register him/herself, and/or his/her children.

FIG. 8, for example, shows a user interface on a Web page where a user may create an account for the user's family. The "create account" page has data fields for entering a user name, password, first name, last name, year of birth, and e-mail address. There is also a data field for a family Web page name so that the user's family has a unique Web page when any member of the family visits the Web site 16. After the user has filled in the data fields 810, the user may select the "next step" button 814 at the bottom of the Web page.

After the user has created an account, the user may register each child in his/her family, and may indicate the particular electronic toys that are owned and/or used by each child. At this time, the user may view a group of toys and may select a set of toys from the group of toys (steps 722, 724 in FIG. 7). FIG. 9, for example, shows a user interface on a Web page including a data field 924 where a user can register a child by entering the child's first name. The user may then select a set of electronic toys that the child uses. For example, eleven electronic educational toys are listed in a section 922 of the Web page shown in FIG. 9. The eleven educational toys that are listed are commercially available from LeapFrog Enterprises, Inc. of Emeryville, Calif. A For example, a user may select a set of four of the eleven toys listed that are used by the listed child "Matthew." In this example, the user has selected the toys called the Imagination Desk™, Leap's Learning Band™, the LeapPad™ Learning System and the Turbo Twist™ Fact Blaster.

The user may also enter the child's school grade and birthday in the data fields 926 into the user interface on the Web page shown in FIG. 9. As will be described below, this information may be used to identify automatically a predetermined curriculum for the child for each of the toys. Using this information, the server computer 17 can automatically select certain curricula that are appropriate for either the child's grade or age and provide these as suggested curricula for use with the various toys.

After the user has entered the child's first name in the data field 924, selected a set of toys in the section 922, and entered the child's grade and birthday in the data fields 926, the user may select the button 928 at the bottom of the user interface to add another child. The same or different set of educational toys can be selected for the next child. If the adult has no other child to add, the user may select the "next step" button 930 to go on to the next step in the process.

As shown in FIG. 10, the user may select from different pre-defined learning strategies as shown in the user interface on a Web page illustrated in FIG. 10. As shown by the section 1032 of the user interface, the Web page may be personalized so that the user knows that a particular lesson plan is being selected for a particular child. In this user interface, a predetermined curriculum can be selected for the particular educational toy and for a particular person. For example, a predetermined curriculum in the form of a 52-week program, or a self-paced learning program can be selected. A parent or child may choose which curriculum suits the person the best. On this Web page, the user may indicate in selectable boxes 1038 that the user wants e-mail reminders to remind the user to visit the Web site 16, and download the next lesson. The e-mail reminders may be sent on a periodic basis (e.g., daily, weekly, monthly). The e-mail reminders may be used as a non-intrusive way to remind persons using the system when they should have completed previous lessons and/or when they should download the next lesson. Thus, various lesson plans can be practiced with various electronic toys. After the user has selected a lesson plan, the "continue" button 1040 at the bottom of the Web page may be selected.

Referring to FIG. 1, the information provided by the user on the user interface shown in FIGS. 8, 9 and 10 may be stored in the user profile database 14 using the server computer 17. Other information, including progress reports and other user specific information may be included in the user profile database 14.

After the server computer 17 stores the list of selected educational toys, the server computer 17 retrieves the selected toys from the user profile database 14 and then displays them in a user interface on the Web site 16 after the user the contacts the Web site 16 to obtain content packages for specific educational toys. Selectable buttons for downloading content packages may be displayed along with the toys. The user can view the selected toys along with descriptions of various content packages and their associated selectable buttons (steps 726 and 728 in FIG. 7).

FIG. 11, for example, shows a user interface on a Web page with the selected toys along with buttons for accessing content packages for each of the toys. The user interface indicates that it is the "Smith Family" Web page. The drop down window 1199 indicates that the toys used by the child Matthew are currently being displayed. The shown images of four toys are "Turbo Twist Fact Blaster™," "LeapPad™," "Learning Band™," and "Imagination Desk™."

A number of selectable buttons are provided on the user interface shown in FIG. 11. There are two columns of selectable buttons. The first column is a "we suggest" column 1196 that includes buttons for suggested content packages that can be downloaded. The second column is a "more options" column 1198 where various buttons for various options are provided. The following selectable buttons are provided for the following toys: "Turbo Twist Fact Blaster™" (a button to find a content package (or "activity pack") 1172, a button to view progress reports 1174 (as described in further detail in U.S. patent application Ser. No. 09/632,424, filed on Aug. 4, 2000), and a button to view previous content packages that have been already downloaded 1176); "LeapPad™" (a button for finding content packages with audio 1160; a button for finding activity sheets that are used with the toy 1162; and a button for viewing previous content packages that have already been downloaded 1164); "Learning Band™" (buttons to download various content packages that include songs 1192, 1194); and "Imagination Desk™" (a button for finding replacement pages 1158 for a user to draw on; a button 1152 to find a coloring book; a button for finding activity sheets and audio 1154; and a button to view past content packages that have been downloaded 1156). The downloading of activity sheets and downloading audio for an interactive apparatus is described in U.S. patent application Ser. No. 09/886,401, filed on Jun. 20, 2001.

Illustratively, the user may select the "find activity sheets" button 1154. After selecting this button 1154, a user interface on a Web page like the one shown in FIG. 12 may be presented to the user. As shown in FIG. 12, buttons 1200 (labeled "GET") are provided for different content packages. As shown, the different content packages may form part of a predetermined curriculum that is to be used with the toy to teach a child about letters and phonics. For example, the Imagination Desk™ activity sheets may be downloaded to the user's site along with audio for the sheets. A "view past activity packs" button 1202 is shown so that a user can view what content packages have been already downloaded. This assists the user in keeping track of which content packages have been used so that new content packages can be used with the various toys.

After the user selects, for example, the button for "week 15" in the Web page shown in FIG. 12, a user interface on a Web page like the one shown in FIG. 13 is presented to the user. A button 1306 to download audio is provided. After selecting this button 1206, the content package that is associated with "Week 15," get ready for kindergarten, is sent from the server computer 17 through the communication medium 18, and to the client computer 20a or 20b. The downloaded content package may comprise audio for the lesson plan associated with Week 15. After the client computer 20a receives the content package, it is transferred to the linker device 19. The linker device 19 may thereafter store the content package on a transferable information storage medium (not shown) that is insertable in the linker device 19. The user may remove the transferable information storage medium and than insert it into the interactive learning appliance 21 (which could be the Imagination Desk™ toy shown in FIG. 13). The content package is loaded into the interactive learning appliance 21 and the user may use the interactive learning appliance 21 (steps 732 and 734 in FIG. 7). The interactive learning appliance 21 need not be in communication with the communication medium 18 or the server computer 17 to be used.

After downloading the content package, the user may print activity sheets that are provided by the server computer 17. The activity sheets may be downloaded to client computer 20a or 20b and may be in the form of standard image files (e.g., image files that are in Adobe Acrobat™), and the sheets may be printed on a printer (not shown). The printed sheets may be used with a learning appliance along with a downloaded content package. For example, the sheets and the downloaded audio may then be used with the Imagination Desk™ toy that is shown in FIG. 13.

Embodiments of the invention have a number of advantages. For example, using embodiments of the invention, a user is able to "manage" the downloaded content for the variety of interactive learning appliances that a family might own. Specific lesson plans can be provided for each person in the family, and for each interactive learning appliance that is owned by the family. Content in the learning appliances can be changed so that the interactive learning appliances are "refreshed" with new content. The learning appliances consequently have a longer useful life as compared to learning appliances that are cannot be electronically changed. Lastly, the ability to pre-select a set of learning appliances from a larger group of learning appliances accelerates the process of downloading content from a server computer. A user can be automatically presented with the electronic learning appliances that are owned by the user's family, without the need to sift through various other Web pages with learning appliances that are not of interest to the user.

As noted above, there are a number of embodiments of the invention.

For example, in some embodiments of the invention, a user can be prompted by the interactive learning appliance to visit an associated Web site. For example, Timmy age 7, has been playing with his math interactive learning appliance and has made it to zone 4. He gets a message on the interactive learning appliance telling him to go to a host entity's Web site. Once Timmy arrives at the Web site and logs in, his log file is uploaded to the Web site and in a matter of seconds his log file is analyzed at the Web site and Timmy is told that he is performing well and is given congratulatory feedback in addition to a summary of his performance for all questions engaged or attempted. The summary can also include a report of performance of previously completed content packages. Based on Timmy's performance (80% of attempted questions correct), a new content package for his interactive learning appliance will be downloaded to Timmy's computer. In the new content package, 70% of the questions will come from level 5, 15% of the questions will come from level 4, and 15% of the questions will come from level 6. The content package can be transferred from Timmy's computer to his interactive learning appliance using a cartridge. The content package modifies the interactive learning appliance. Using the modified appliance and the new content package, Timmy can continue to have exciting and challenging math experiences.

In other embodiments of the present invention, learning appliances can be updated and "refreshed" with new electronic content. This extends the working life of the learning appliances like electronic toys. By comparison, in the past, electronic toys with only pre-stored content were simply used and then thrown away once a child outgrew them or became bored with their content. For example, in one embodiment of the invention, the content package for the electronic toy may comprise current information. The learning appliance may be, for example, an electronic, interactive, talking globe. Electronic talking globes are current commercially available from LeapFrog Enterprises, Inc., under the trade name "Explorer™." The electronic talking globe can be updated with current information such as current populations of countries, current facts about the countries, etc. The talking globe can be "refreshed" with current information using embodiments of the invention.

The content packages may include applications, information, problems (e.g., questions), games, etc. in static or dynamic form. The content packages may also include audio data for music, speech or sound effects for an audio output device, as well as visual data for images that may be displayed on a visual output device.

In yet other embodiments, the interactive learning appliance may include an apparatus that includes an electrographic position location system. The apparatus could include an interactive globe or a platform with a stylus (i.e., a print media receiving unit assembly). In the latter example, a print medium such as a book is placed on the platform. Audio can be produced in response to selecting predetermined areas of the book. In some embodiments, a stylus may be used to select print elements in a print medium. Examples of such electrographic position location apparatuses are described in U.S. Pat. Nos. 5,686,705 and 5,877,458, and U.S. patent application Ser. No. 09/574,499, filed on May 19, 2000, 60/200,722, filed on Apr. 27, 2000 and 60/200, 960, filed on May 1, 2000. Yet other interactive learning appliances include interactive plush dolls of the type that are described in U.S. patent application Ser. No. 10/230,956, filed on Aug. 28, 2002, as well as interactive apparatuses like those described in U.S. patent application Ser. No. 10/218, 688, filed on Aug. 12, 2002 (entitled "Study Aid Apparatus & Method of Using Study Aid Apparatus"), Ser. No. 09/886,399, filed on Jun. 20, 2001 (entitled "Interactive Apparatus with Templates") and Ser. No. 09/886,401, filed on Jun. 20, 2001 (entitled "Interactive Apparatus With Print Media"). All of the above U.S. Patents, and patent applications (provisional and non-provisional) are herein incorporated by reference in their entirety for all purposes.

In some embodiments, the processed user data is summarized in a user-specific report, which may also be called a summary of usage report. The summary of usage report can include information such as, but not limited to, the user's name, curriculum, devices and content package used, the length of time and the number of times each content package is used, percentage of right answers and percentage of wrong answers per content package used, and the number of times a content package's help function is invoked. The summary of usage can include any type of information logged by an interactive learning appliance or that can be derived from that information. The summary of usage report also can provide a framework for inputting other information, such as standardized test scores and report card grades.

The summary of usage report in the user interface can be accessed via the Internet and viewed by a parent, teacher or other authorized persons including the user. Because the report is server-based (e.g., Web-based), it can be viewed from virtually any location via the Internet. The summary of usage report can be used as a basis to assess skills and to gain other insights into a user's performance and interests. In addition, authorized persons such as teachers can access the Web-based information and provide feedback and recommendations. Each user has a specific Web page devoted to the users learning, providing a centralized and readily accessible resource that can be used to facilitate and monitor the user's learning progress.

Furthermore, along with the summary of usage report, recommendations targeted to the user can be provided. In general, the recommendations are intended to help the user progress to the next level of learning. Specifically, interactive learning appliances and content packages in addition to those already registered with the account can be suggested (displayed). The suggested interactive learning appliances and content packages may be related to those already registered with the account, or they may be targeted to the user based on, for example, the user's profile, interests and performance to help the user progress through the current task/skill level and on to the next level.

Progress of a user can be measured in a number of ways such as (1) determining the number of skills with which the child has engaged in a single content package or across multiple content packages, (2) recognizing that the child has engaged with skills above the child's grade level, (3) measuring that the child has spent a specific amount of time using a particular content package, (4) measuring the percentage of correct answers or the percentage of incorrect answers, (5) determining that the child has engaged all questions in a content package, regardless of whether the child has responded to all questions correctly, and/or (6) recognizing that the child has been through the same questions in a content package a predetermined number of times, thus indicating that the potential for the child to learn from the content package has decreased—also referred to as content package fatigue. As used above in this paragraph, "engage" means that the child has interacted with a content package, such as attempting to answer questions presented by the content package. It does not necessarily mean that the child has correctly responded to questions presented by the content package.

In particular, interactive learning appliances and content packages that can address a gap in the user's curriculum or that can address a perceived area of weakness can be suggested. For example, the metrics in the summary of usage report can be compared against established benchmarks to identify areas of study or skill sets where more emphasis may be beneficial. Then, content packages and interactive learning appliances that teach or reinforce those skill sets can be identified. The skill sets each content package is designed to promote can also be listed. In other words, content packages can be mapped to skill sets, and skill sets can be mapped to content packages and interactive learning appliances, making it easier for parents to pick-and-choose the interactive learning appliance/content package most suitable for their child's needs or interests.

The recommendations may also include activities that can be performed without using the interactive learning appliance 21. For example, the user interface can provide executable links (hyperlinks) can be provided to printable worksheets that are completed manually or experientially instead of electronically.

While particular examples of GUIs are described above, embodiments according to the present invention are not limited to the content or format of those examples. That is, variations in the way the GUIs are formatted are permissible, and the content may be distributed across the GUIs in different ways (e.g., content shown as appearing within one Web page may be distributed among multiple Web pages, and vice versa).

In summary, according to embodiments of the present invention, the effectiveness of technology-based interactive learning appliance and related content packages is increased by giving parents the capability to see and measure what their children are actually learning, so that progress can be tracked and areas of strength as well as areas where extra attention may be needed can be identified.

Embodiments of the present invention are thus described. While the present invention has been described in particular embodiments, it should be appreciated that the present invention should not be construed as limited by such embodiments, but rather construed according to the below claims.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention.

All references, patent applications and patents mentioned above are herein incorporated by reference in their entirety for all purposes. None of them are admitted to be prior art to the presently claimed inventions.

What is claimed is:

1. A method of downloading educational content comprising:
    receiving from a client computer, at the server computer including a non-transitory computer-readable medium, a user log file generated by an interactive learning appliance toy from user interactions with one or more content packages using the interactive learning appliance toy, wherein the interactive learning appliance toy includes one or more movable rings or movable buttons that a user uses to operate the learning appliance toy, and the learning appliance toy is configured to test one or more skills of the user;
    determining, by the server computer, at least one current zone for the user for each skill tested by the interactive learning appliance toy;
    analyzing, by the server computer, the user log file to determine most common errors made by the user;
    selecting, by the server computer, problems to include in a content package based on the user's at least one current zone for each skill tested by the interactive learning appliance toy and the most common errors made by the user;
    generating, by the server computer, the content package tailored to profile information of the user and including the selected problems based on the at least one current zone for each skill tested by the interactive learning appliance toy and the most common errors made by the user; and
    sending, by the server computer, the content package to the client computer via an electronic communication medium, wherein the client computer transfers the content package to a storage medium in the interactive learning appliance toy, the content package modifying the operation of the interactive learning appliance toy.

2. The method of claim 1 wherein each of the one or more skill tested by the interactive learning appliance toy comprise multiple zones.

3. The method of claim 1 wherein each zone is associated with problems with a predetermined level of difficulty.

4. The method of claim 1 further comprising:
    analyzing the user log file to determine that one or more current zones should be incremented, maintained or decremented based on a number of problems the user has answered correctly and a number of problems the user has attempted.

5. The method of claim 1 wherein the user is a first user and further comprising:
    sending, to a second user, a report showing the first user's performance based on the user log file and one or more first user performance logs.

6. The method of claim 1 further comprising:
    determining a percentage of problems answered correctly by the user when interacting with the interactive learning appliance toy; and
    for each at least one current zone:
    determining a number of problems attempted by the user for the current zone for the user;
    incrementing the current zone when the percent of problems answered correctly by the user when interacting with the interactive learning appliance toy is more than a predetermined percentage and the number of problems attempted by the user for the current zone for the user is more than a predetermined number of problems;
    decrementing the current zone when the percent of problems answered correctly by the user when interacting with the interactive learning device is less than a predetermined percentage and the number of problems attempted by the user for the current zone for the user is more than a predetermined number of problems;
    maintaining the current zone when the number of problems attempted by the user for the current zone for the user is less than a predetermined number of problems.

7. The method of claim 1 further comprising:
    retrieving, by the server computer, profile information of the user after receiving the user log file.

8. The method of claim 1 further comprising: retrieving, by the server computer, one or more user performance logs comprising past performance information for the user from one or more user log files for the user.

9. The method of claim 8 wherein the performance information includes information related to errors made by the user when interacting with the interactive learning appliance toy.

10. The method of claim 8 further comprising:
analyzing, by the server computer, the one or more user performance logs comprising past performance information to determine most common past errors made by the user; and
wherein selecting problems to include in a content package is also based on the most common past errors made by the user.

11. The method of claim 8 further comprising:
generating, by the server computer, a report showing the user's performance based on the user log file and the one or more user performance logs.

12. The method of claim 8 wherein the past performance information includes one or more of the following: response to latency by the user, frequency of correct responses provided by the user, frequency of incorrect responses provided by the user, correctness or incorrectness of the most recent responses provided by the user, problem identifiers of problems attempted by the user, or types of problems attempted by the user.

13. The method of claim 1 further comprising:
generating, by the server computer, a report showing the user's performance based on the user log file.

14. The method of claim 1 further comprising:
selecting, by the server computer, facts and questions to include in the content package based on the user's at least one current zone for each skill tested by the interactive learning appliance toy and the most common errors made by the user.

15. The method of claim 1 further comprising: updating user performance log information in a database after receiving the user log file.

16. The method of claim 1 wherein analyzing the user log file to determine most common errors made by the user includes conducting an error analysis comprising:
determining whether a response provided by the user is correct or incorrect;
marking a problem record associated with the response as tried for the user;
incrementing a percent correct variable for a problem zone if the answer is correct; and
incrementing an error counter of common error types associated with a particular problem if the answer is incorrect.

17. A server computer including a non-transitory computer-readable medium configured to:
receive from a client computer, a user log file generated by an interactive learning appliance toy from user interactions with one or more content packages using the interactive learning appliance toy, wherein the interactive learning appliance toy includes one or more movable rings or movable buttons that a user uses to operate the learning appliance toy, and the interactive learning appliance toy is configured to test one or more skills;
determine at least one current zone for the user for each skill tested by the interactive learning appliance toy;
analyze the user log file to determine most common errors made by the user;
select problems to include in a content package based on the user's at least one current zone for each skill tested by the interactive learning appliance toy and the most common errors made by the user;
generate content to be included in a content package tailored to profile information of the user and including the selected problems based on the at least one current zone for each skill tested by the interactive learning appliance toy and the most common errors made by the user; and
send the content package to the client computer via an electronic communication medium, wherein the client computer transfers the content package to a storage medium in the interactive learning appliance toy, the content package modifying the operation of the interactive learning appliance toy.

18. A client computer including a non-transitory computer-readable medium configured to display a user interface comprising:
profile information of a user;
a user log file generated by an interactive learning appliance toy from user interactions with one or more content packages using the interactive learning appliance toy, wherein the interactive learning appliance toy includes one or more movable rings or movable buttons that a user uses to operate the learning appliance toy, and the interactive learning appliance toy is configured to test one or more skills of the user;
a report showing the user's performance based on the user log file and one or more user performance logs; and
content to be included in a content package tailored to the profile information of the user and based on at least one current zone for at least one skill tested by the interactive learning appliance toy and most common errors made by the user determined from the user log file, the content package modifying the operation of the interactive learning appliance toy.

19. The client computer of claim 18 wherein the log file is received via a linker device capable of transferring data between a client computer and many different types of interactive learning appliance toys.

20. The client computer of claim 18 wherein the user interface is displayed via a Web site operating on a server computer.

21. The client computer of claim 20 wherein the client computer is capable of communicating with the server computer via the Internet.

* * * * *